(12) United States Patent
Baldi et al.

(10) Patent No.: US 12,695,560 B2
(45) Date of Patent: Jul. 28, 2026

(54) METHODS AND SYSTEMS FOR SELECTIVELY APPLYING A TRANSFORM TO A PACKET

(71) Applicant: Pensando Systems Inc., Milpitas, CA (US)

(72) Inventors: Mario Baldi, Harpswell, ME (US); Roger Andersson, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 800 days.

(21) Appl. No.: 17/965,368

(22) Filed: Oct. 13, 2022

(65) Prior Publication Data

US 2024/0129080 A1    Apr. 18, 2024

(51) Int. Cl.
 H04L 5/00         (2006.01)
 H04L 9/06         (2006.01)
(52) U.S. Cl.
 CPC .......... H04L 5/0044 (2013.01); H04L 9/0618 (2013.01)
(58) Field of Classification Search
 CPC ........................... H04L 5/0044; H04L 9/0618
 See application file for complete search history.

(56) References Cited

U.S. PATENT DOCUMENTS 7,613,920 B2   11/2009  Gustave et al.
7,970,013 B2    6/2011  Sinha et al.
8,418,241 B2    4/2013  Elzur
8,745,373 B2    6/2014  Molsberry et al.
8,769,257 B2    7/2014  Sood
8,799,671 B2    8/2014  Conte et al.
10,992,652 B2   4/2021  Putatunda et al.
11,012,429 B2   5/2021  Dhanabalan et al.
2004/0114634 A1*  6/2004  Liu ........................ H04L 63/045
                                                     370/252

(Continued)

FOREIGN PATENT DOCUMENTS

EP          1758310 A1      2/2007

OTHER PUBLICATIONS

Barker, Elaine et al. "Guide to IPsec VPNs", NIST Special Publication 800-77, Revision 1, Jun. 2020, 166 pgs.

(Continued)

*Primary Examiner* — Elton Williams

(57)         ABSTRACT

Packets may be transformed cryptographically or compressively in order to secure network communications and to preserve network bandwidth. The transformations may be applied at more than one protocol layer which can result in unnecessary operations such encrypting or compressing data that is already encrypted. This wastes processing resources. A solution is to selectively apply transformations. A network appliance can receive an initial layer packet for transmission to a network destination. The initial layer header of the initial layer packet can be used to determine an initial state indicator that indicates an initial state (e.g., encrypted, compressed, etc.) of an initial layer payload of the initial layer packet. The initial layer packet can be encapsulated in a subsequent layer packet as a subsequent layer payload. Selectively applying a transform to the subsequent layer payload based on the initial state indicator can avoid the unnecessary operation.

34 Claims, 22 Drawing Sheets

(56)             References Cited

U.S. PATENT DOCUMENTS

| | | | | |
|---|---|---|---|---|
| 2006/0235992 | A1* | 10/2006 | Matias | H04L 65/1101 709/236 |
| 2007/0043940 | A1* | 2/2007 | Gustave | H04L 63/0471 713/150 |
| 2021/0263744 | A1* | 8/2021 | Crupnicoff | G06F 9/382 |
| 2023/0379154 | A1* | 11/2023 | Naeimi | H04L 63/166 |

OTHER PUBLICATIONS

Shacham, A. et al. "IP Payload Compression Protocol (IPComp)", Network Working Group, Request for Comments: 3173, Sep. 2001, 13 pgs.
Westphal, C. et al. "Adaptive Video Streaming over Information-Centric Networking (ICN)", Internet Research Task Force (IRTF), Request for Comments: 7933, Aug. 2016, 40 pgs.
Rescorla, E. et al. "The Transport Layer Security (TLS) Protocol Version 1.3", Internet Engineering Task Force (IETF), Request for Comments: 8446, Aug. 2018, 160 pgs.
Guard, "Secure Networking 101; MACsec, IPsec, and SSL Basics", (2019), 10 pgs.
Guard, "Secure Networking MACsec Fundamentals", (2019), 18 pgs.
Hedlund, Brad "Securing your network connection to the cloud: MACSec vs. IPSec", Aug. 30, 2021, 8 pgs.
Google Cloud, "Google Cloud Security Whitepapers", Mar. 2018, 97 pgs.
Stockhammer, Thomas, "Dynamic Adaptive Streaming over HTTP—Design Principles and Standards", (2011), 3 pgs.
Cloudfare, "What is TLS (Transport Layer Security)?, https://www.cloudfare.com/learning/ssl/transport-layer-security-tls/", downloaded Oct. 2022, 6 pgs.
Cisco, "Innovations in Ethernet Encryption (802.1AE—MACsec) for Securing High Speed (1-100GE) WAN Deployments", White Paper, (2016), 22 pgs.

* cited by examiner

800

| Packet 1 850 | Packet 2 851 | Packet 3 852 | Packet 4 853 | o o o | Packet N 854 |
|---|---|---|---|---|---|

Layer 2 Header    801

| Source MAC address 804 | Destination MAC address 805 | Optional 802.1Q Header (0x8100) 806 | Optional VLAN Tag Information 807 | Other L2 Header Data 808 | Layer 2 Payload 802 | FCS 803 |
|---|---|---|---|---|---|---|

Layer 3 Header    810

| Source IP address 812 | Destination IP address 813 | Protocol 814 | Other L3 Header Data 815 | Layer 3 Payload 811 |
|---|---|---|---|---|

Layer 4 Header    820

| Source Port 822 | Destination Port 823 | L4 Flags 824 | Other L4 Header Data 825 | Layer 4 Payload 821 |
|---|---|---|---|---|

Layer 7 Packet / Layer 4 Payload (HTTP packet example)    830

| Layer 7 Header (e.g. HTTP Header) 831 | Layer 7 Payload (e.g. HTTP Message Body) 832 |
|---|---|
| HTTP/1.1 200 OK<br>Date: Mon, 27 Jul 2009 12:28:53 GMT<br>Server: Apache/2.2.14 (Win32)<br>Last-Modified: Wed, 22 Jul 2009 19:15:56 GMT<br>Content-Length: 88<br>Content-Type: text/html<br>Connection: Closed | \<html><br>\<body><br>\<h1>Hello, World!\</h1><br>\</body><br>\</html> |

| Transformation Policy Table (Protocol Layers)          2001 | | | | | |
|---|---|---|---|---|---|
| Layer 2 (Transport Layer) Initial State Indicator | Layer 3 (Network Layer) Initial State Indicator | Layer 7 (Application Layer) Initial State Indicator | Tenant Identifier | Layer 3 Transformation Intent | Layer 2 Transformation Intent |
| Encrypted | Not Encrypted | Not Encrypted | A | Don't Compress Don't Encrypt | Don't Encrypt Don't Compress |
| Not Encrypted | Encrypted | Encrypted | A | Don't Compress Don't Encrypt | Don't Encrypt Don't Compress |
| Any | Not Encrypted Not Compressed | Not Encrypted Not Compressed | A | Do Compress Don't Encrypt | Don't Compress Do Encrypt |
| Any | Any | Any | B | Do Compress Do Encrypt | Don't Compress Do Encrypt |
| Compressed | Compressed | Compressed | C | Don't Compress Do Encrypt | Don't Compress Do Encrypt |
| Any | Any | Any | C | Do Compress Do Encrypt | Don't Compress Do Encrypt |

FIG. 20A

| Transformation Policy Table (Protocol Layers)          2002 | | | |
|---|---|---|---|
| Initial State Indicator of Initial Layer Payload | Tenant Identifier | Layer 3 Transformation Intent | Layer 2 Transformation Intent |
| Encrypted Compressed | A | Don't Compress Don't Encrypt | Don't Compress Don't Encrypt |
| Not Encrypted Compressed | A | Don't Compress Do Encrypt | Don't Encrypt Don't Compress |
| Not Encrypted Not Compressed | A | Do Compress Do Encrypt | Don't Compress Do Encrypt |
| Any | B | Do Compress Do Encrypt | Don't Compress Do Encrypt |
| Compressed | C | Don't Compress Do Encrypt | Don't Compress Do Encrypt |
| Not Compressed | C | Do Compress Do Encrypt | Don't Compress Do Encrypt |

FIG. 20B

Transformation Policy Table (Protocol Layers)
2003

| Initial State Indicator of Initial Layer Payload | Tenant Identifier | Subsequent Packet Transformation Intent |
|---|---|---|
| Encrypted Any Compression | A | Don't Compress Don't Encrypt |
| Not Encrypted Compressed | A | Don't Compress Do Encrypt |
| Not Encrypted Not Compressed | A | Do Compress Do Encrypt |
| Any | B | Do Compress Do Encrypt |
| Compressed | C | Don't Compress Do Encrypt |
| Not Compressed | C | Do Compress Do Encrypt |

FIG. 20C

Transformation Policy Table (Protocols)     2004

| Initial Packet Protocol | Initial State Indicator of Initial Layer Payload | Tenant Identifier | Subsequent Packet Transformation Intent | Subsequent Packet Protocol |
|---|---|---|---|---|
| IP | Not Encrypted | A | Encrypt | IPSEC |
| IP | Encrypted | A | None | Ethernet or WiFi Not MACSEC |
| IPSEC | Any | A | None | Ethernet or WiFi Not MACSEC |
| Ethernet or WiFi Not MACSEC | Not Encrypted | A | Do Encrypt | Ethernet or WiFi MACSEC |
| Ethernet or WiFi Not MACSEC | Encrypted | A | None | Ethernet or WiFi Not MACSEC |
| Ethernet or WiFi MACSEC | Any | B | None | Ethernet or WiFi MACSEC |
| HTTPS | Any | C | None | TCP/IP |
| HTTP | Any | C | Do Encrypt | HTTPS |

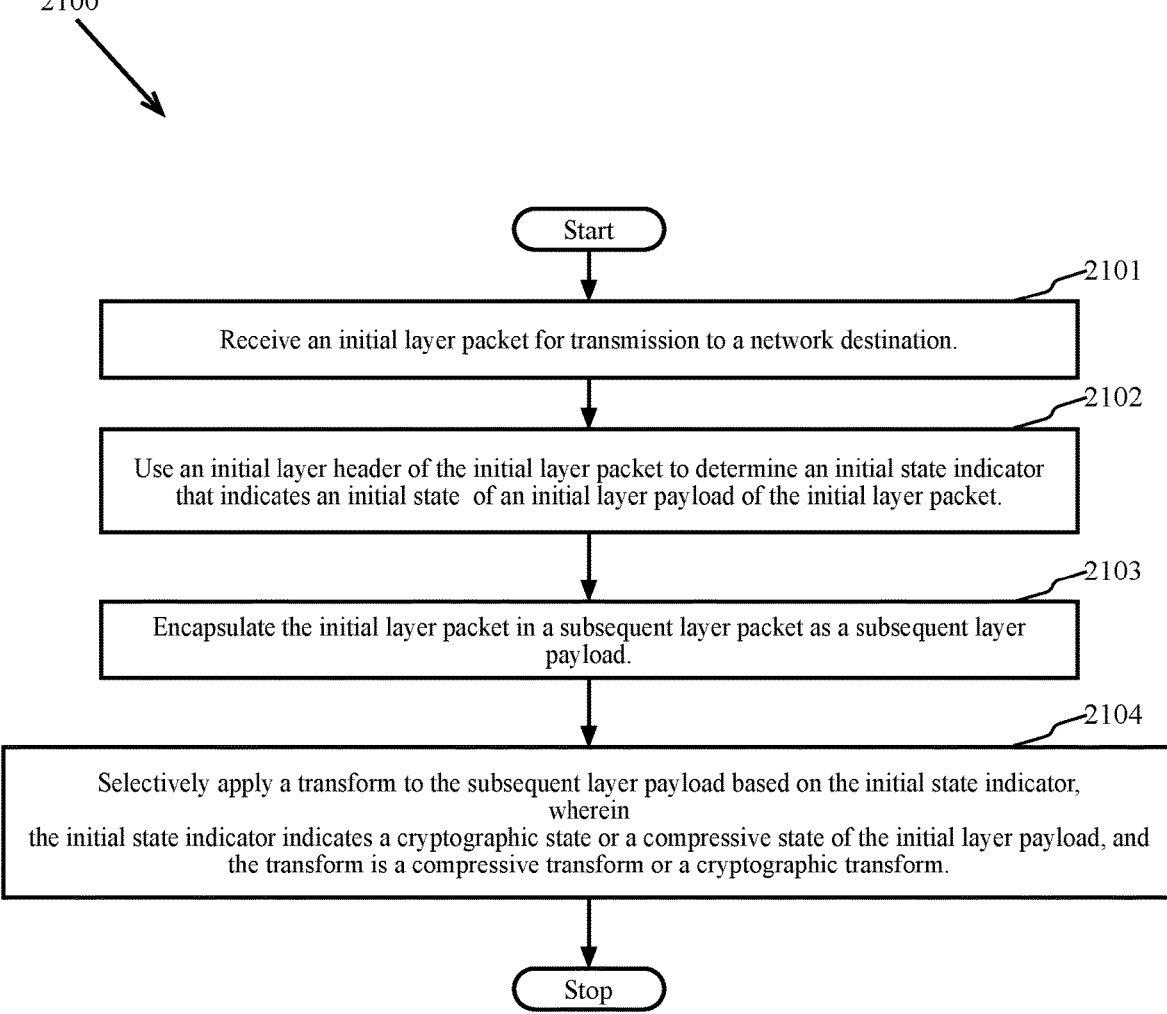

Start

2101

Receive an initial layer packet for transmission to a network destination.

2102

Use an initial layer header of the initial layer packet to determine an initial state indicator that indicates an initial state of an initial layer payload of the initial layer packet.

2103

Encapsulate the initial layer packet in a subsequent layer packet as a subsequent layer payload.

2104

Selectively apply a transform to the subsequent layer payload based on the initial state indicator, wherein
the initial state indicator indicates a cryptographic state or a compressive state of the initial layer payload, and the transform is a compressive transform or a cryptographic transform.

Stop

FIG. 21

METHODS AND SYSTEMS FOR SELECTIVELY APPLYING A TRANSFORM TO A PACKET

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, application specific integrated circuits implementing packet processing pipelines, and to conditionally applying transforms to packet payloads. Encryption and compression are examples of transforms that may be selectively applied to packet payloads.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances has been defined in the "P4$_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include receiving an initial layer packet for transmission to a network destination, using an initial layer header of the initial layer packet to determine an initial state indicator that indicates an initial state of an initial layer payload of the initial layer packet, encapsulating the initial layer packet in a subsequent layer packet as a subsequent layer payload, and selectively applying a transform to the subsequent layer payload based on the initial state indicator.

Another aspect of the subject matter described in this disclosure can be implemented as a network appliance. The network appliance can include communicating with a remote host using a plurality of session packets of a session that includes a plurality of inbound session packets and a plurality of outbound session packets, using at least one initial layer header of at least one of the session packets to determine an initial state indicator that indicates an initial state of the session, and selectively applying a transform to the outbound session packets based on the initial state indicator, wherein the initial state indicator indicates an initial cryptographic state or an initial compressive state of session packet payloads, the transform is a compressive transform or a cryptographic transform, the outbound session packets are transmitted to the remote host, and the inbound session packets are received from the remote host.

Yet another aspect of the subject matter described in this disclosure can be implemented in a system. system can include a means for using a packet header of a packet to determine an initial state of the packet, a means for encapsulating the packet as a payload of an other packet, and a means for selectively applying a transform to the payload based on the initial state of the packet.

Yet further aspects of the subject matter described in this disclosure can be implemented in a system. The system can include a packet cryptographic and compressive transform inferencer that produces an initial state indicator that indicates an initial protocol level encryption state of an initial layer payload of an initial layer packet, and a subsequent layer packet encapsulator that encapsulates an initial layer packet in a subsequent layer payload of a subsequent layer packet, wherein the subsequent layer packet encapsulator selectively applies a transform to the subsequent layer payload based on the initial state indicator.

In some implementations of the methods and devices, the initial state indicator indicates a cryptographic state or a compressive state of the initial layer payload, and the transform is a compressive transform or a cryptographic transform. In some implementations of the methods and devices, the subsequent layer packet is an internet protocol (IP) packet. In some implementations of the methods and devices, the subsequent layer packet is an Ethernet packet. In some implementations of the methods and devices, the method further includes extracting an initial layer header field data from an initial layer header field of the initial layer header, and using the initial layer header field data to determine the initial state indicator.

In some implementations of the methods and devices, the transform is not applied to the subsequent layer payload because the initial state indicator indicates that the initial layer payload is encrypted. In some implementations of the methods and devices, the initial layer packet is a transport layer security (TLS) record or a Secure Socket Layer (SSL) message or a layer 7 packet. In some implementations of the methods and devices, the initial layer packet is a layer 4 packet. In some implementations of the methods and devices, the initial layer packet is a layer 3 packet or an IP packet. In some implementations of the methods and devices, the subsequent layer packet is an internet protocol security (IPSEC) packet. In some implementations of the methods and devices, the initial layer packet is an internet protocol security (IPSEC) packet. In some implementations of the methods and devices, the subsequent layer packet is a media access control security (MACsec) packet.

In some implementations of the methods and devices, the transform is not applied to the subsequent layer payload because the initial state indicator indicates that the initial layer payload is compressed. In some implementations of the methods and devices, a compression algorithm is not applied to the initial layer payload because the initial state indicator indicates that the initial layer payload is encrypted. In some implementations of the methods and devices, the method further includes storing a transformation policy table that associates a plurality of transformation intents with a plurality of payload states for a plurality of protocol layers, and using the transformation policy table to determine a transformation intent for the subsequent layer payload, wherein selectively applying the transform to the subsequent layer payload based on the initial state is accomplished by transforming the subsequent layer payload in accordance with the transformation intent. In some implementations of the methods and devices, the transformation policy table associates the transformation intents with the payload states, the protocol layers, and a tenant identifier.

In some implementations of the methods and devices, the method further includes storing a transformation policy table that associates a plurality of transformation intents with a plurality of payload states for a plurality of network protocols, and using the transformation policy table to determine a transformation intent for the subsequent layer payload, wherein selectively applying the transform to the subsequent layer payload based on the initial state is accomplished by transforming the subsequent layer payload in accordance with the transformation intent. In some implementations of the methods and devices, a network appliance includes a packet processing pipeline circuit that includes a parser, the parser extracts a header field data from the initial layer header, the network appliance uses the header field data to determine the initial state indicator, and the network appliance selectively applies the transform to the subsequent layer payload based on the initial state indicator. In some implementations of the methods and devices, the transform is a cryptographic transform that is applied to the subsequent layer payload because the initial state indicator indicates that the initial layer payload did not undergo a cryptographic transformation. In some implementations of the methods and devices, the transform is a compressive transform that is not applied to the subsequent layer payload because the initial state indicator indicates that the initial layer payload did undergo a cryptographic transformation.

In some implementations of the methods and devices, the initial layer header is an internet protocol (IP) header. In some implementations of the methods and devices, the initial layer header is TLS, SSL or layer 7. In some implementations of the methods and devices, a network appliance includes a packet processing pipeline circuit that includes a parser, the parser extracts a header field data from the at least one initial layer header, the network appliance uses the header field data to determine the initial state indicator, and the network appliance applies the transform to the outbound session packets.

In some implementations of the methods and devices, the system further includes a means for determining a transformation intent based on the initial state and a network protocol, wherein the payload is transformed in accordance with the transformation intent. In some implementations of the methods and devices, the system further includes a CPU offload means for extracting a header field data from the packet header, and a means for determining a transformation intent based on the initial state and the header field data, wherein the payload is transformed in accordance with the transformation intent.

In some implementations of the methods and devices, the system further includes a cryptographic transform circuit, wherein the initial state indicator indicates a cryptographic state of the initial layer payload, and wherein the transform is a cryptographic transform performed by the cryptographic transform circuit. In some implementations of the methods and devices, the system further includes a packet processing pipeline circuit that includes a parser and a plurality of match-action units configured as a plurality of processing stages of a packet processing pipeline, and at least one central processing unit (CPU) core, wherein the at least one CPU core configures the packet processing pipeline to implement the packet cryptographic and compressive transform inferencer. In some implementations of the methods and devices, the system further includes a cryptographic transform circuit, wherein the initial state indicator indicates a cryptographic state of the initial layer payload, wherein the transform is a cryptographic transform performed by the cryptographic transform circuit, and wherein the at least one CPU core configures at least one of the match-action units to command the cryptographic transform circuit to apply the cryptographic transform to the subsequent layer payload based on the initial state indicator.

In some implementations of the methods and devices, the system further includes a compression circuit, wherein the initial state indicator indicates a cryptographic state of the initial layer payload, wherein the transform is a compressive transform performed by the compression circuit, and wherein the at least one CPU core configures at least one of the match-action units to command the compression circuit to apply the compressive transform to the subsequent layer payload based on the initial state indicator. In some implementations of the methods and devices, the system further includes a cryptographic transform circuit configured to apply a cryptographic transform, and a compression circuit configured to apply a compressive transform, wherein the initial state indicator indicates a cryptographic state and a compressive transform state of the initial layer payload, and wherein the transform is the cryptographic transform or the compressive transform. In some implementations of the methods and devices, the system further includes the transform is applied to the subsequent layer payload because the initial state indicator indicates that the initial layer payload is not encrypted or not compressed.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 8 illustrates packet headers and payloads of packets for network traffic flows including layer 7 fields according to some aspects.

FIG. 20A, FIG. 20B, FIG. 20C, and FIG. 20D are high-level block diagrams illustrating exemplary transformation policy tables that may be used for selectively transforming a packet according to some aspects.

FIG. 21 is a high-level flow diagram illustrating a method for selective encryption of network packets according to some aspects.

Throughout the description, similar reference numbers may be used to identify similar elements.

DETAILED DESCRIPTION

Figure 1A:
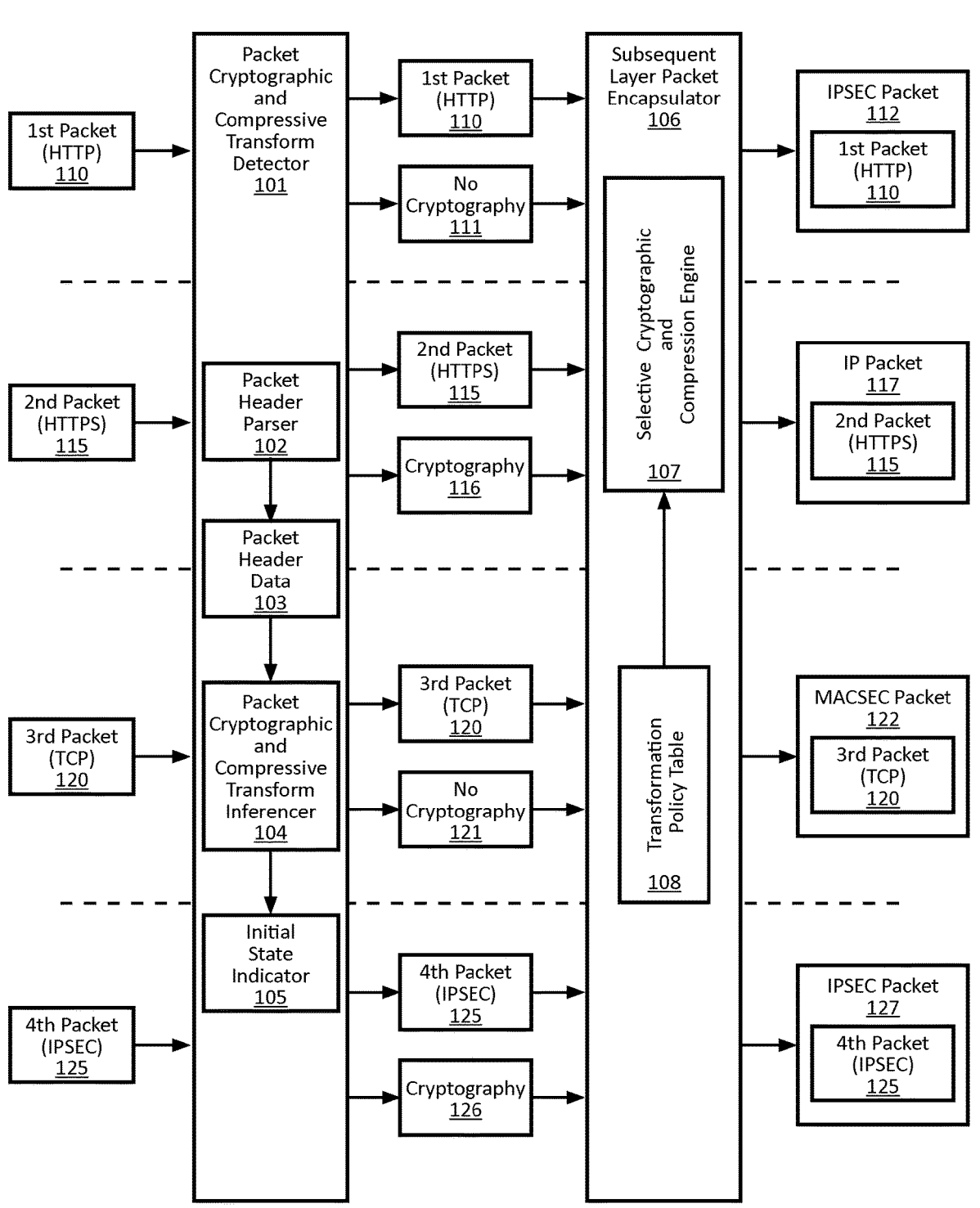
FIG. 1A and FIG. 1B are high level conceptual diagrams illustrating selectively applying a transform to subsequent layer packets based on an initial cryptographic or compressive state of an initial layer packet according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Systems and methods that implement aspects of the embodiments may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one embodiment. Thus, discussions of the features and advantages, and similar language, throughout this specification may, but do not necessarily, refer to the same embodiment.

Furthermore, the described features, advantages, characteristics, and aspects may be combined in any suitable manner in one or more systems or methods. One skilled in the relevant art will recognize, in light of the description herein, that an embodiment can be practiced without one or more of the specific features or advantages of another embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Computer networks share information by exchanging network packets that use standardized protocols at various protocol layers. An aspect of the protocol layers is that the packets of higher layer protocols are usually encapsulated in packets of lower layer protocols. Layer 7 packets can be encapsulated in layer 4 packets. Layer 4 packets can be encapsulated in layer 3 packets. Layer 3 packets can be encapsulated in layer 2 packets. As such, lower layer protocol packets carry the higher layer protocol packets by encapsulating the higher layer protocol packets. For example, media access control (MAC) packets are layer 2 packets that can carry internet protocol (IP) packets. IP packets are layer 3 packets that can carry transmission control protocol (TCP) packets. TCP packets are layer 4 packets that can carry hypertext transport protocol (HTTP) packets. HTTP packets are layer 7 packets.

The packets at different protocol layers can enhance security by encrypting their payloads and may preserve network bandwidth by compressing their payloads. The media access control security (MACsec) protocol is a layer 2 protocol that provides point to point security on Ethernet links by encrypting the layer 2 payload. The layer 2 payload is a layer 3 packet such as an IP packet. The internet protocol security (IPSEC) protocol provides security between computers on an IP network by encrypting the layer 3 payload. The layer 3 payload is a layer 4 packet. The transport layer security (TLS) protocol can be used to encrypt data carried in layer 4 payloads, such as TCP payloads. For example, Hypertext transfer protocol secure (HTTPS) is HTTP carried by TLS. As can be seen by all the encryption at the various layers, a network packet can be triple encrypted via MACsec, IPSEC, and HTTPS. Encrypting the payloads at all the protocol levels can waste networking and computing resources. For example, communications that are secured by HTTPS may not need to be further secured by IPSEC or MACsec.

Compressing after encrypting can also waste networking and computing resources. Network communications can be compressed via data compression algorithms (e.g., Lempel-Ziv algorithms, Lempel-Ziv-Welch algorithms, run length coding, Huffman coding, etc.). However, data compression is ineffective when the data is encrypted because the compressive transforms used for data compression rely on redundancies and predictability in the data. The cryptographic transforms used to encrypt data can obscure or remove redundancies and predictability from the data. As such, compression after encryption can also be a waste of networking and computing resources.

Selective encryption or compression can be used to preserve networking and computing resources. Encryption or compression at the various protocol levels can be detected from the header data of an initial layer packet (e.g., a layer 3 packet). If compression or encryption is detected, then further compression or encryption may be avoided. The detection of compression/encryption may be based on the packets' header data. Such detection is fast and can be performed using the parsers that are implemented in many networking appliances. For example, a network interface card (NIC) installed in a server may be a smartNIC that includes numerous central processing unit (CPU) offload circuits such as packet processing pipeline circuits, compression circuits, decompression circuits, and cryptographic transform circuits. A smartNIC can be used to encapsulate HTTPS traffic in IPSEC, and MACsec. Triple encryption being a waste of resources, the smartNIC may detect the HTTPS content and, based on configurable policies, encapsulate the HTTPS traffic in TCP, IP, and Ethernet packets. Here, selective encryption has preserved networking resources because two encryption stages are avoided.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

Figure 1B:
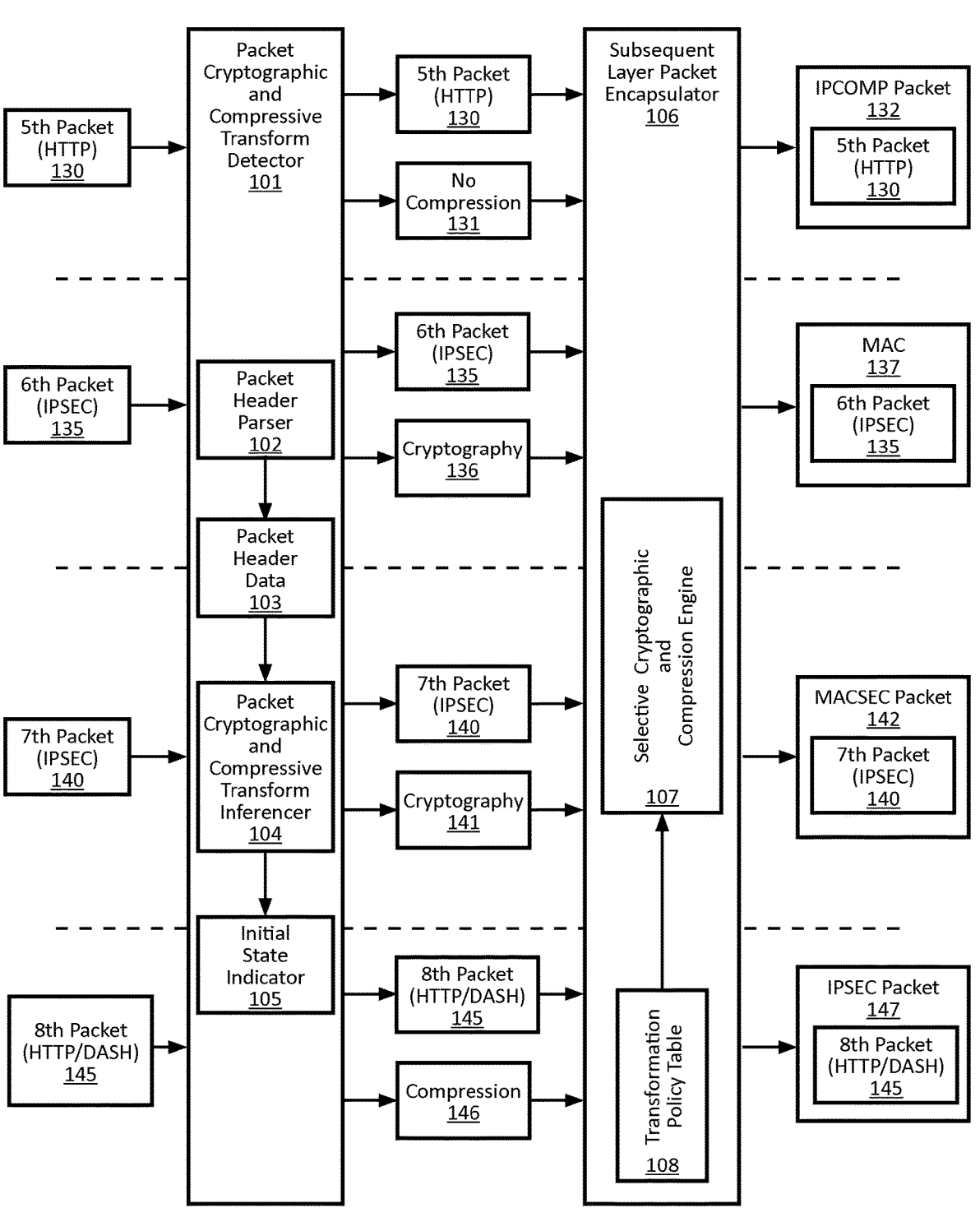

FIG. 1A and FIG. 1B are high level conceptual diagrams illustrating selectively applying a transform to subsequent layer packets based on an initial cryptographic or compressive state of an initial layer packet according to some aspects. A packet cryptographic and compressive transform detector 101 can include a packet header parser 102 and a packet cryptographic and compressive transform inferencer 104. The packet header parser 102 can parse the header of an initial layer packet to obtain header data 103. As such, the parser can extract header field data from the packet headers of network packets. The packet cryptographic and compressive transform inferencer 104 examines the header data 103 and produces an initial state indicator 105 based on the header data 103. The initial state indicator can indicate if the initial layer packet contains an encrypted or a compressed payload. A subsequent layer packet encapsulator 106 can receive the initial layer packet and the initial state indicator 105. The subsequent layer packet encapsulator 106 encapsulates an initial layer packet in a subsequent layer packet. For example, the initial layer packet can be an IP packet and the subsequent layer packet can be a MACsec packet in which the IP packet is encapsulated. The subsequent layer packet encapsulator 106 can include a transformation policy table 108 and a selective cryptographic and compression engine 107. The transformation policy table 108 can include policies that indicate whether or not to encrypt or compress the payload of a subsequent layer packet based on the initial state indicator. The selective cryptographic and compression engine 107 can implement the policies in the transformation policy table 108.

FIG. 1A and FIG. 1B have initial layer packets on the left side and subsequent layer packets on the right side. In a first example, a layer 7 payload that is not encrypted is encrypted at layer 3. The first initial layer packet 110 is an HTTP packet. The packet cryptographic and compressive transform detector 101 examines the header of the first initial layer packet 110 and produces a first initial state indicator 111 that indicates no cryptographic transform has been applied. The subsequent layer packet encapsulator 106 encapsulates the first initial layer packet 110 in a first subsequent layer packet 112. Based on the first initial state indicator 111 and the transformation policy table 108, the first subsequent layer packet 112 is an IPSEC packet. In a second example, a layer 7 payload that is encrypted is not further encrypted. The second initial layer packet 115 is an HTTPS packet. The packet cryptographic and compressive transform detector 101 examines the header of the second initial layer packet 115 and produces a second initial state indicator 116 that indicates a cryptographic transform has been applied. The subsequent layer packet encapsulator 106 encapsulates the second initial layer packet 115 in a second subsequent layer packet 117. Based on the second initial state indicator 116 and the transformation policy table 108, the second subsequent layer packet 117 is an IP packet.

In a third example, a layer 4 payload that is not encrypted is encrypted at layer 2. The third initial layer packet 120 is a TCP packet. The packet cryptographic and compressive transform detector 101 examines the header of the third initial layer packet 120 and produces a third initial state indicator 121 that indicates no cryptographic transform has been applied. The subsequent layer packet encapsulator 106 encapsulates the third initial layer packet 120 in a third subsequent layer packet 122. Based on the third initial state indicator 121 and the transformation policy table 108, the third subsequent layer packet 122 is a MACsec packet. In a fourth example, a layer 4 payload (here, IPSEC is considered to be layer 4) that is encrypted is encrypted again at layer 4. The fourth initial layer packet 125 is an IPSEC packet. The packet cryptographic and compressive transform detector 101 examines the header of the fourth initial layer packet 125 and produces a fourth initial state indicator 126 that indicates no cryptographic transform has been applied. The subsequent layer packet encapsulator 106 encapsulates the fourth initial layer packet 125 in a fourth subsequent layer packet 127. Based on the fourth initial state indicator 126 and the transformation policy table 108, the fourth subsequent layer packet 127 is an IPSEC packet.

In a fifth example, a layer 7 payload that is not compressed is compressed. The fifth initial layer packet 130 is an HTTP packet. The packet cryptographic and compressive transform detector 101 examines the header of the fifth initial layer packet 130 and produces a fifth initial state indicator 131 that indicates no compressive transform has been applied. The subsequent layer packet encapsulator 106 encapsulates the fifth initial layer packet 130 in a fifth subsequent layer packet 132. Based on the fifth initial state indicator 131 and the transformation policy table 108, the fifth subsequent layer packet 132 is an IP payload compression (IPCOMP) packet. In a sixth example, a layer 4 payload that is encrypted is not further compressed or encrypted. The sixth initial layer packet 135 is an IPSEC packet. The packet cryptographic and compressive transform detector 101 examines the header of the sixth initial layer packet 135 and produces a sixth initial state indicator 136 that indicates a cryptographic transform has been applied. The subsequent layer packet encapsulator 106 encapsulates the sixth initial layer packet 135 in a sixth subsequent layer packet 137. Based on the sixth initial state indicator 136 and the transformation policy table 108, the sixth subsequent layer packet 137 is a MAC packet.

In a seventh example, a layer 4 payload that is encrypted is further encrypted. Here the policy may be to always use MACsec. The seventh initial layer packet 140 is an IPSEC packet. The packet cryptographic and compressive transform detector 101 examines the header of the seventh initial layer packet 140 and produces a seventh initial state indicator 141 that indicates a cryptographic transform has been applied. The subsequent layer packet encapsulator 106 encapsulates the seventh initial layer packet 140 in a seventh subsequent layer packet 142. Based on the seventh initial state indicator 141 and the transformation policy table 108, the seventh subsequent layer packet 142 is a MACsec packet. In an eighth example, a layer 7 payload that is compressed is encrypted but not further compressed. The eighth initial layer packet 145 is an HTTP/DASH packet. The packet cryptographic and compressive transform detector 101 examines the header of the eighth initial layer packet 145 and produces an eighth initial state indicator 146 that indicates a compressive transform has been applied. The subsequent layer packet encapsulator 106 encapsulates the eighth initial layer packet 145 in an eighth subsequent layer packet 147. Based on the eighth initial state indicator 146 and the transformation policy table 108, the eighth subsequent layer packet 147 is an IPSEC packet.

Figure 2:
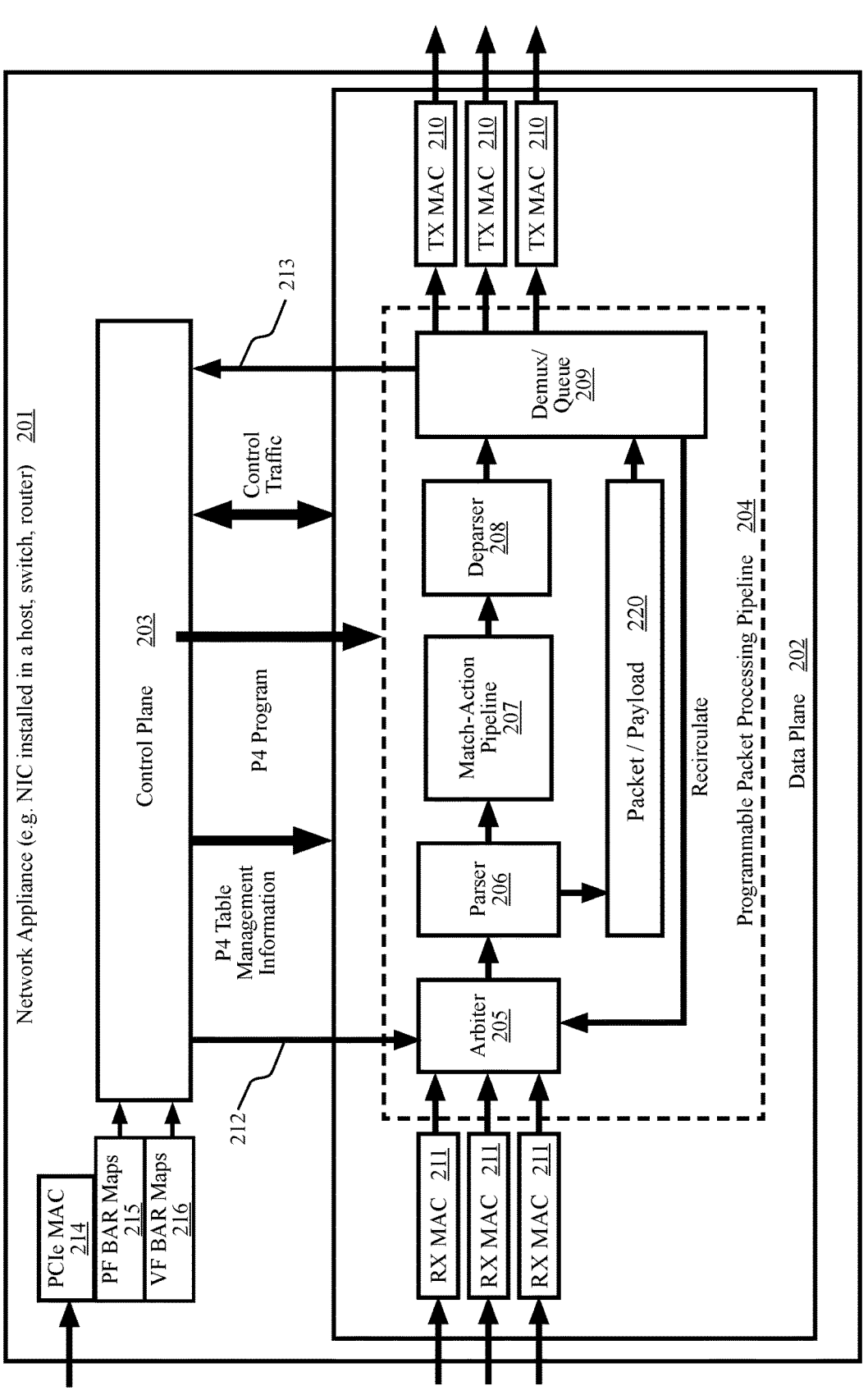
FIG. 2 is a functional block diagram of a network appliance having a control plane and a data plane and in which aspects may be implemented.

FIG. 2 is a functional block diagram of a network appliance having a control plane and a data plane and in which aspects may be implemented. A network appliance 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIB s) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EI-GRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "P4$_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output CPU port 213. The control plane is often referred to as a CPU (central processing unit) although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A network appliance 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-MY) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The Infini-Band PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
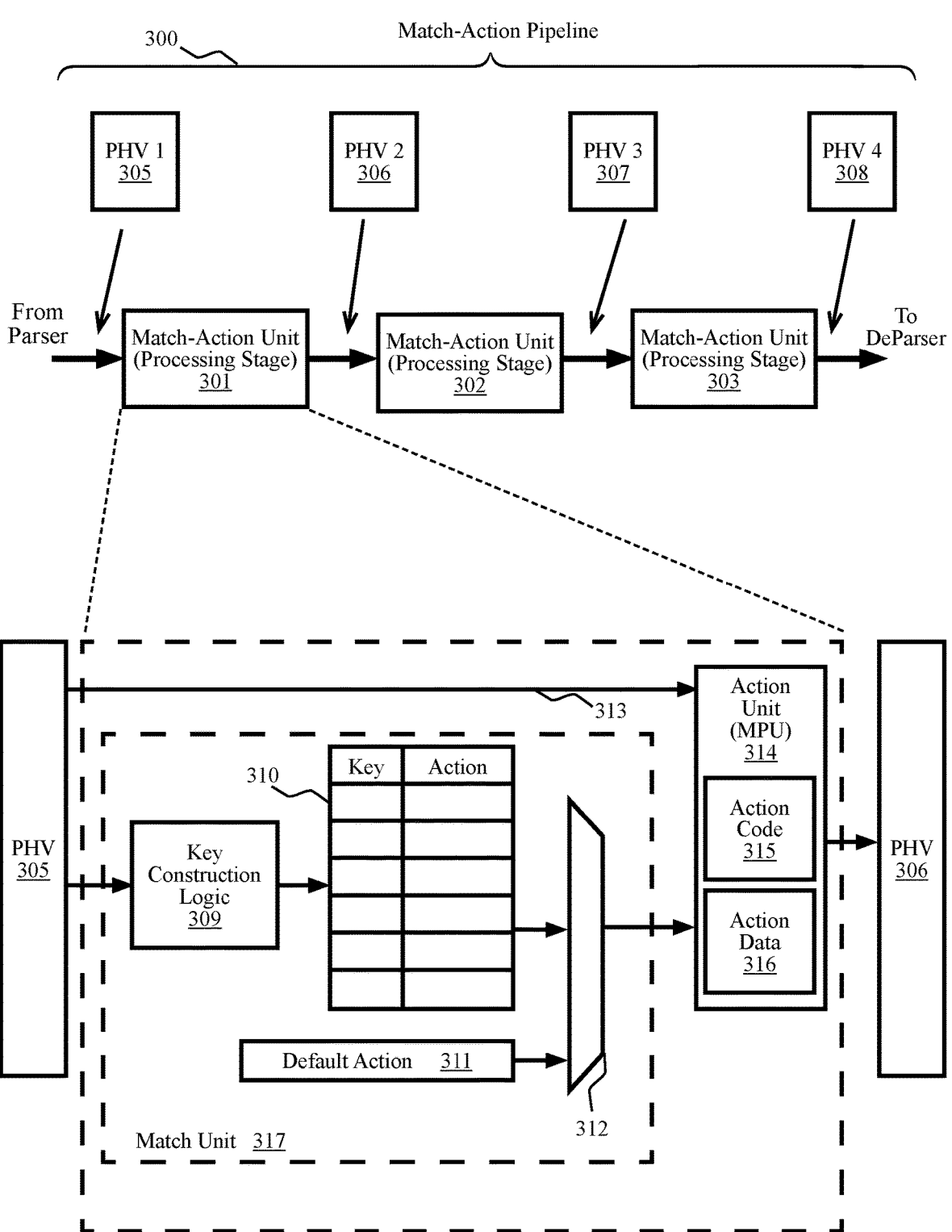
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often simply called stages, of the packet processing pipeline. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
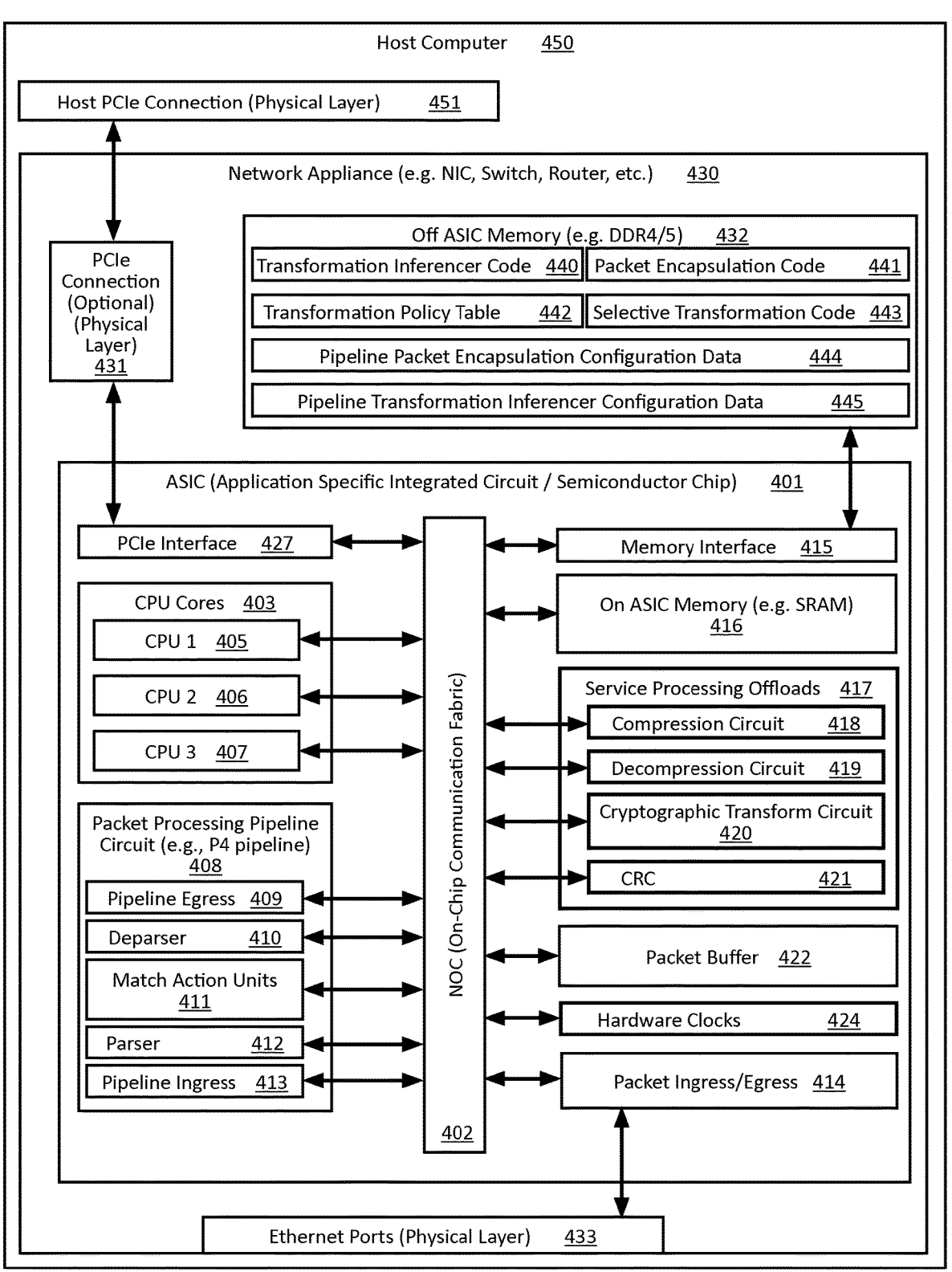
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer 450 and can act as a network appliance for the host computer and for virtual machines running on the host computer. Such a NIC can have a PCIe connection 431 for communicating with the host computer 450 via a host PCIe connection 451. The network appliance 430 can have an ASIC 401, off ASIC memory 432, and ethernet ports 433. The off ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, CPU cores 403, P4 packet processing pipeline 408 elements, memory interface 415, on ASIC memory such as static random access memory (SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a cryptographic transform circuit 420, and a cyclic redundancy check (CRC) calculation circuit 421. The compression circuit 418 can apply a compressive transform (e.g., run length coding, Lempel Ziv, Lempel Ziv Welch, etc.) to a block of data such as a packet or packet payload that is stored in memory or a packet buffer. The decompression circuit 419 can apply a decompressive transform to a block of data, this is essentially the inverse of applying a compressive transform. The cryptographic transform circuit 420 can apply cryptographic transforms (e.g., public key encryption, authentication, etc.) to a block of data such as a packet or packet payload that is stored in memory or a packet buffer. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/. . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The packet processing pipeline circuit 408 is a specialized set of elements for processing network packets such as IP (internet protocol) packets and InfiniBand PDUs (protocol data units). The packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services, configuring the data plane, etc. The network appliance can use the memory 432 to store transformation inferencer code 440, packet encapsulation code 441, a transformation policy table 442, selective transformation code 443, pipeline packet encapsulation configuration data 444, and pipeline transformation inferencer configuration data 445. The transformation inferencer code 440 can be executable code that, when executed, uses header data to determine if an initial layer packet has a compressed or encrypted payload and to produce an initial state indicator. The packet encapsulation code 441 can be executable code that, when executed, uses header data such as the header data in a PHV to encapsulate an initial layer packet in a subsequent layer packet. The executable code may command a CPU offload such as a compression circuit 418, decompression circuit 419, or cryptographic transform circuit 420 to transform data that is stored in memory, a packet buffer, etc. The transformation policy table 442 can be a table that a user, a network engineer, an equipment manufacturer, or other entity configures with selective transformation policies. The selective transformation code 443 can be executable code that uses the initial state indicator and the transformation policy table to determine what, if any, transformations are to be applied to a packet or payload and then causes those transformations to be performed. Transformations can be caused by either performing them or commanding a CPU offload or other circuit to perform them. The selective cryptographic and compression engine 107 may be implemented by a CPU core that executes the selective transformation code 443. The pipeline packet encapsulation configuration data 444 can be used to configure a packet processing pipeline to encapsulate an initial layer packet in a subsequent layer packet. The deparser of some packet processing pipeline circuits can produce a layer 2 packet from a PHV and a payload that is in the packet buffer. In some cases, the packet may be recirculated through the packet processing pipeline such that the pipeline can cause the cryptographic transform circuit to encrypt a payload, the compression circuit to compress the payload, etc. The selective cryptographic and compression engine 107 may be a packet processing pipeline that has been configured with the pipeline packet encapsulation configuration data 444. The pipeline transformation inferencer configuration data 445 can be used to configure a packet processing pipeline to determine if an initial layer packet has a compressed or encrypted payload and to produce an initial state indicator. The pipelines parser can produce the header data as a PHV and a processing stage of the pipeline can check the header fields in the PHV to determine if the initial layer packet has a compressed or encrypted payload.

The CPU cores 403 can be general purpose processor cores, such as ARM processor cores, microprocessor without interlocked pipelined stages (MIPS) processor cores, and/or x86 processor cores, as is known in the field. Each CPU core can include a memory interface, an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuit 408.

The packet processing pipeline circuit 408 can be a specialized circuit or part of a specialized circuit using one or more ASICs or FPGAs to implement programmable packet processing pipelines such as the programmable packet processing pipeline 204 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuit 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
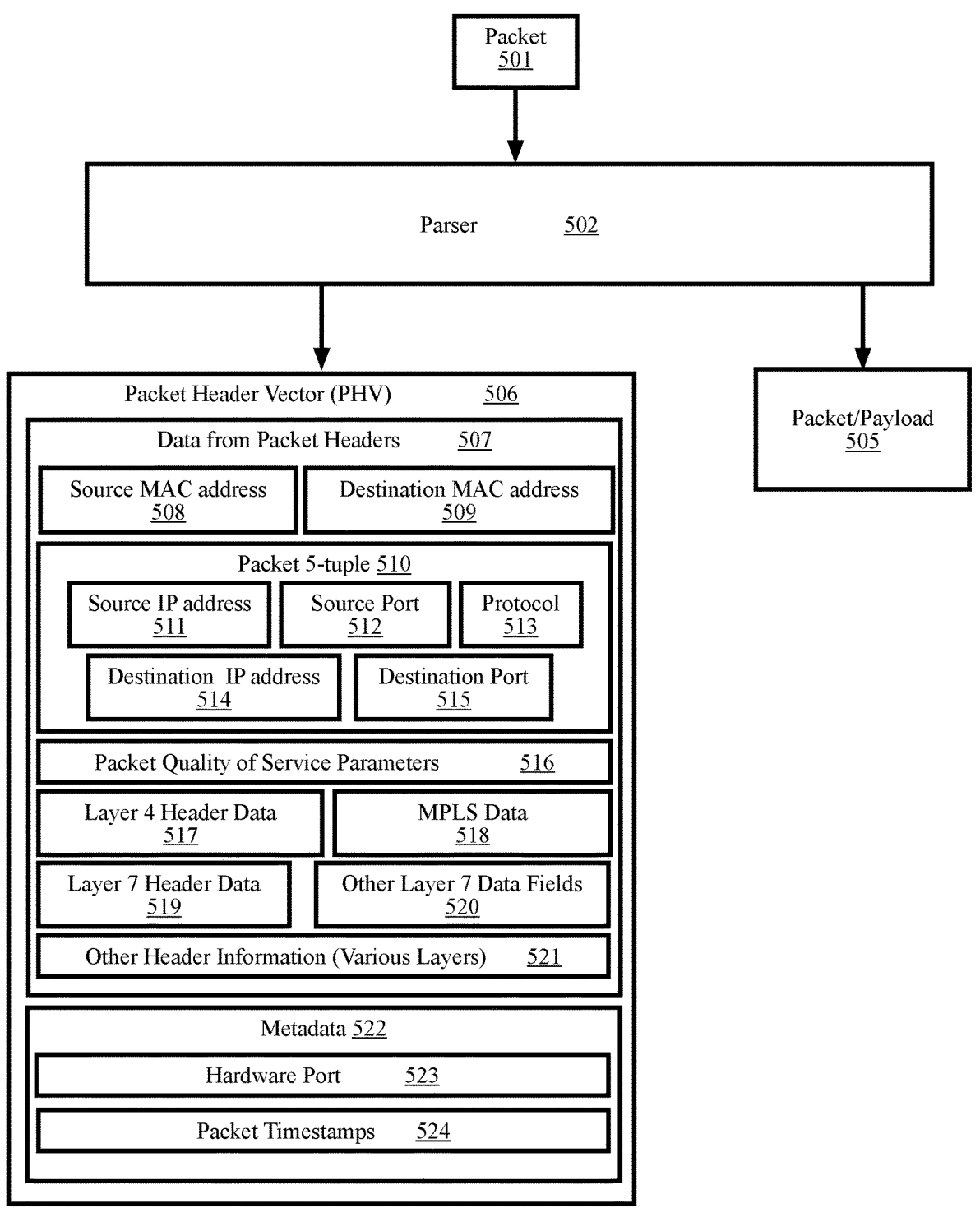
FIG. 5 is a high-level diagram illustrating an example of generating a packet header vector from a packet according to some aspects.

FIG. 5 is a high-level diagram illustrating an example of generating a packet header vector 506 from a packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the network appliance such as the hardware port 523 on which the packet 501 was received and the packet timestamps 524 indicating when the packet 501 was received by the network appliance, enqueued, dequeued, etc.

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
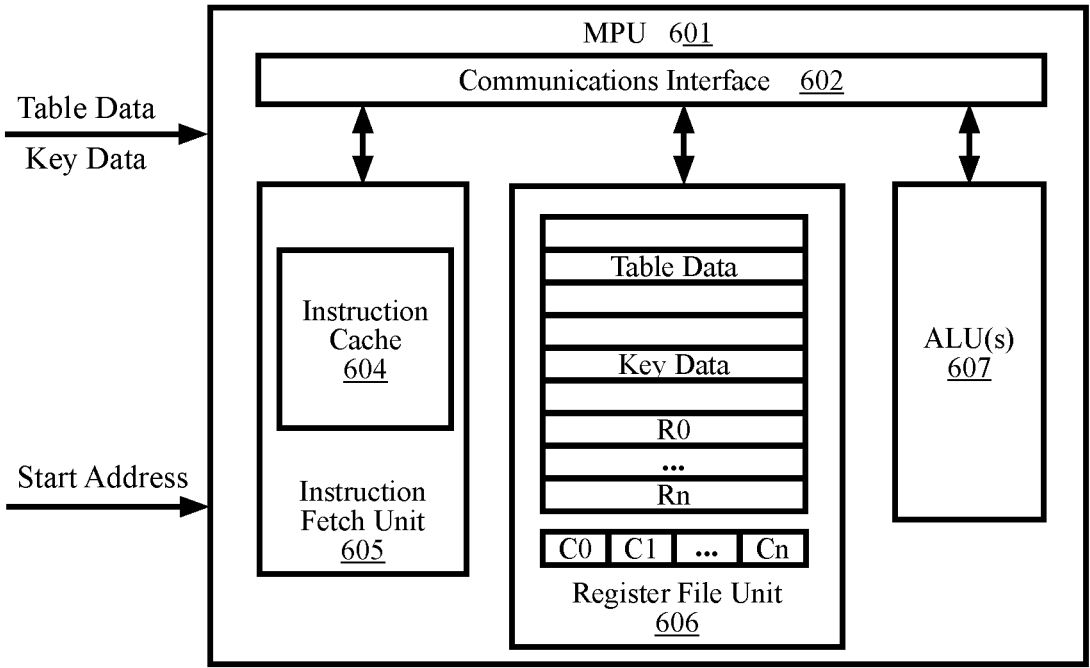
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action unit.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
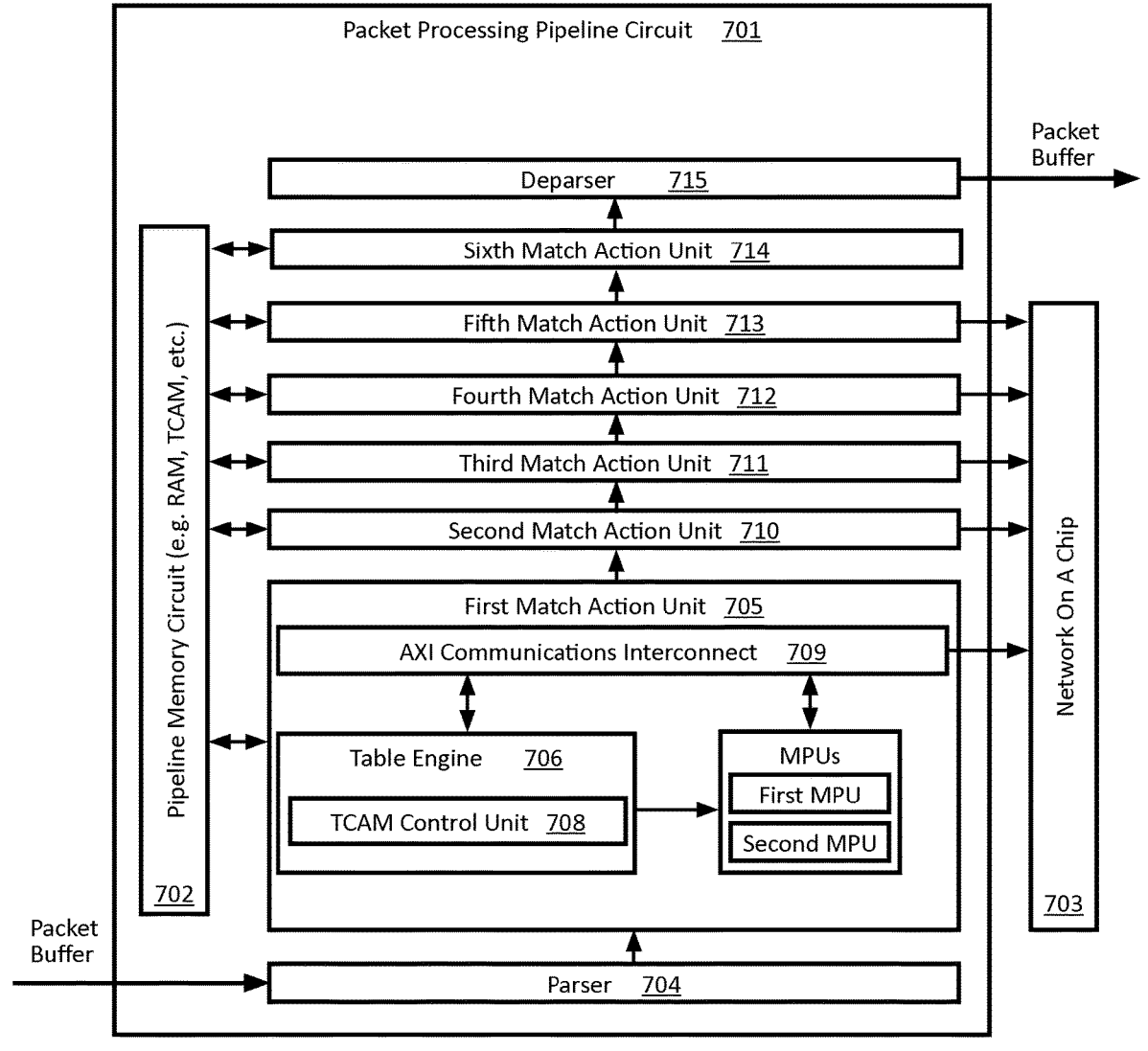
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline implemented by an ASIC. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through processing stages (e.g., processing stages 705, 710, 711, 712, 713, 714) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action units 705, 710, 711, 712, 713, 714 can be the same as the MPU 601 of FIG. 6. Match-action units can have any number of MPUs. The match-action units of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 7. In practice, a match-action pipeline can have any number of match-action units. The match-action units can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow. A session can include two network flows, also called network traffic flows. A first one of the network flows can pass from a first computer to a second computer. A second one of the network traffic flows can pass from the second computer to the first computer. From the perspective of the first computer, the first one of the network flows consists of outbound session packets and the second one of the network traffic flows consists of inbound session packets. From the perspective of the second computer, the first one of the network flows consists of inbound session packets and the second one of the network traffic flows consists of outbound session packets.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a network appliance 201 can have MAC addresses. A network appliance 201 can have a MAC address that is applied to all or some of the ports. Alternatively, a network appliance may have one or more ports that each have their own MAC address. In general, each port can send and receive packets. As such, a port of a network appliance can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the inter-mediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP carried by IP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a con-nectionless model.

A layer 4 packet (a TCP packet is shown) can have a layer 4 header 820 and a layer 4 payload 821. The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Trans-fer Protocol (HTTP), File Transfer Protocol (FTP), Simple Mail Transfer Protocol (SMTP), and Dynamic Host Con-figuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. A layer 7 packet can have a layer 7 header 831 and a layer 7 payload 832. The illustrated layer 7 packet is an HTTP packet. The layer 7 header 831 is an HTTP header, and the layer 7 payload 832 is an HTTP message body. The HTTP message body is illustrated as a hypertext markup language (HTML) document. HTTP is specified in requests for com-ment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly when those specific fields reliably occur at specific locations within the HTML document. Such is often the case when servers consistently respond by providing HTML documents.

The Ethernet protocol, WiFi protocol, MACsec protocol, IP protocol, IPSEC protocol, TCP protocol, UDP protocol, TLS protocol, SSL protocol, HTTP protocol, and HTTPS protocol are all examples of network protocols. Those practiced in communications networks are familiar with these and many other network protocols.

Figure 9:
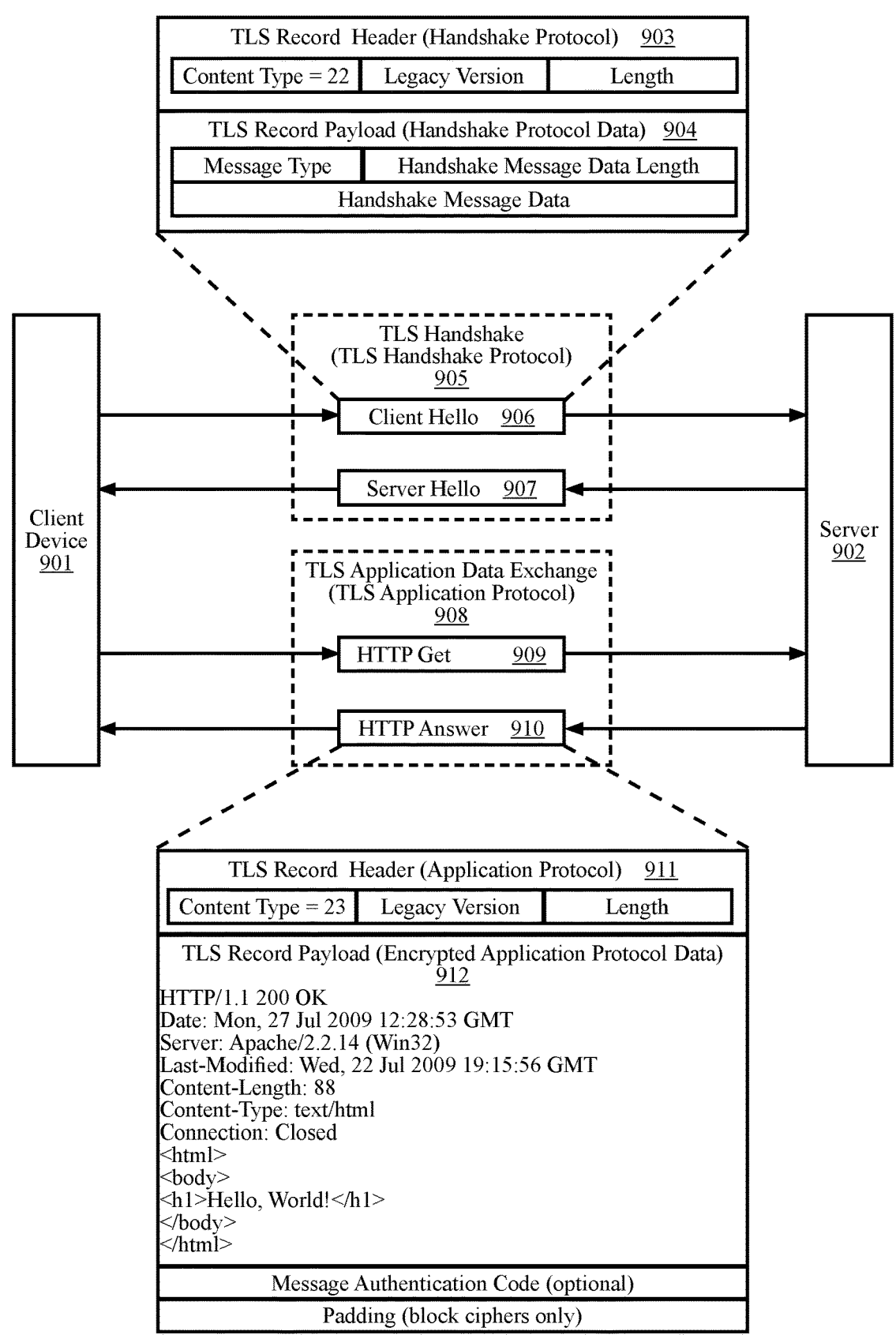
FIG. 9 is a high-level conceptual diagram illustrating network communications using HTTP over TLS, also called HTTPS, according to some aspects.

FIG. 9 is a high-level conceptual diagram illustrating network communications using HTTP over TLS, also called HTTPS, according to some aspects. IETF RFC 8446, dated August 2018, specifies version 1.3 of TLS. Two devices, such as a client device 901 and a server 902, can commu-nicate using TLS. TLS can use TCP as a transport. TLS communications use a series of records that are, in essence, packets that have headers and can have payloads. As such, a parser can not only determine if a TCP payload includes TLS records, but can also parse the TLS record headers. With regard to network layers, TLS is sometimes said to be located between layer 7 and layer 4. For the purposes of this disclosure, TLS can be treated as a layer 7 protocol even though it can encapsulate other layer 7 protocols such as HTTP. As such, HTTPS (HTTP over TLS) can be treated as a layer 7 protocol.

In order to communicate securely, the client device 901 and the server 902 use a TLS handshake 905 to establish a TLS application data exchange 908 which is a secure connection. After the TLS connection is established, the devices can communicate securely using the TLS application protocol. The TLS handshake 905 can include a client hello 906 and a server hello 907. The client hello 906 and the server hello 907 use records formatted according to the TLS handshake protocol. Records using the TLS handshake protocol include a TLS record header 903 and TLS record payload 904. The TLS record header 903 has a content type field that indicates the content type=22, thereby indicating that this is a handshake protocol record. The TLS record payload 904 includes data that the client device 901 and the server 902 can use for establishing the secure connection.

The TLS application data exchange 908 uses TLS records that are formatted in accordance with the TLS application protocol. The records include a TLS record header 911 and a TLS record payload 912. The TLS record header 911 has a content type field that indicates the content type=23, thereby indicating that this is an application data exchange protocol record. The TLS record payload 912 includes encrypted application data. The TLS record payload 912 is illustrated as including HTTP data. As such, the client device 901 and the server 902 use a TLS handshake 905 to establish an HTTPS connection and then use a TLS application data exchange 908 to exchange HTTP data over the HTTPS connection.

FIG. 9 shows that the packet cryptographic and compressive transform detector 101 can infer that a cryptographic transform has been applied when a TCP packet includes a TLS record that has a content type equaling 23.

Figure 10:
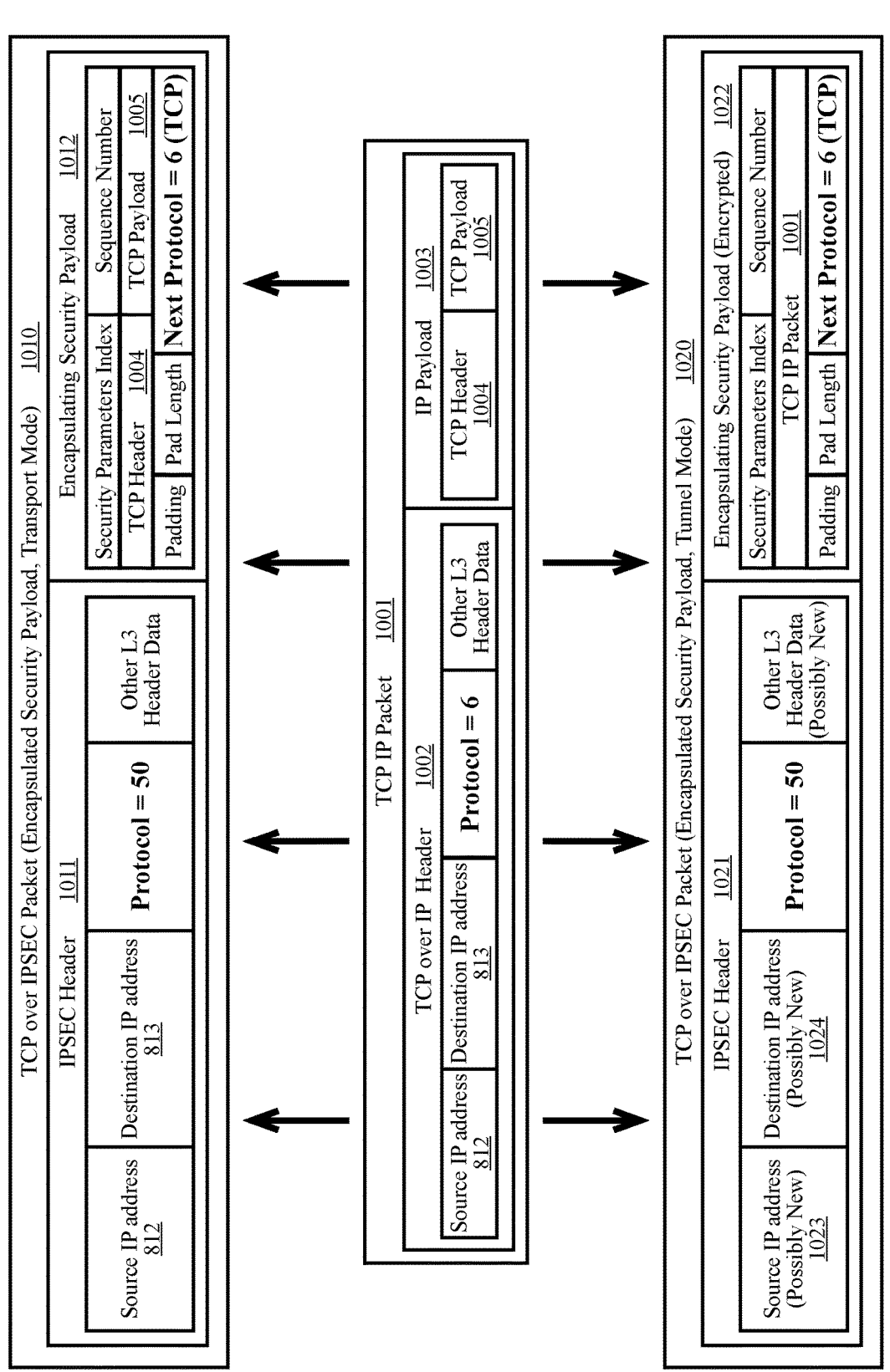
FIG. 10 is a high-level conceptual diagram illustrating IPSEC packets that can be produced from an IP packet, according to some aspects.

FIG. 10 is a high-level conceptual diagram illustrating IPSEC packets that can be produced from an IP packet, according to some aspects. IETF RFCs 1825, 1826, and 1827 specify IPSEC. A TCP/IP packet 1001 can include a TCP/IP header 1002 and an IP payload 1003. The TCP/IP header 1002 is an IP header with protocol=6 because protocol 6 is defined as TCP. The TCP/IP header includes a source IP address 812, destination IP address 813, the protocol field (protocol value=6) and other layer 3 header data. The IP payload 1003 includes a TCP header 1004 and a TCP payload 1005.

In transport mode, the TCP over IPSEC packet 1010 has an IPSEC header 1011 and an encapsulated security payload (ESP) 1012. The IPSEC header 1011 includes a source IP address 812, destination IP address 813, a protocol field (protocol value=50), and other layer 3 header data. An IP header with protocol=50 indicates an IPSEC packet. In transport mode, the source IP address 812 and the destination IP address 813 are the same as in the TCP/IP packet 1001. In transport mode, the ESP 1012 includes a security parameters index, a sequence number, the TCP header 1004, the TCP payload 1005, and a next protocol indicator that has the value 6 because 6 is the protocol value that indicates TCP in IP packets. The TCP header 1004 and the TCP payload 1005 are encrypted. The security parameters index and the sequence number are not encrypted.

In tunnel mode, the TCP over IPSEC packet 1020 has an IPSEC header 1021 and an encapsulated security payload (ESP) 1022. The IPSEC header 1021 includes a source IP address 1023, destination IP address 1024, a protocol field (protocol value=50), and other layer 3 header data. The source IP address 1023 and the destination IP address 1024 are the tunnel endpoints for an IPSEC tunnel and may be different from the source and destination addresses of the TCP/IP packet 1001. In tunnel mode, the ESP 1022 includes a security parameters index, a sequence number, the TCP/IP packet 1001, and a next protocol indicator that has the value 6 which is the same as the protocol value in the header of the TCP/IP packet 1001. The TCP/IP packet in the ESP 1022 is encrypted. The security parameters index and the sequence number are not encrypted.

FIG. 10 shows that the packet cryptographic and compressive transform detector 101 can infer that a cryptographic transform has been applied when an IP packet has a protocol value equaling 50.

Figure 11:
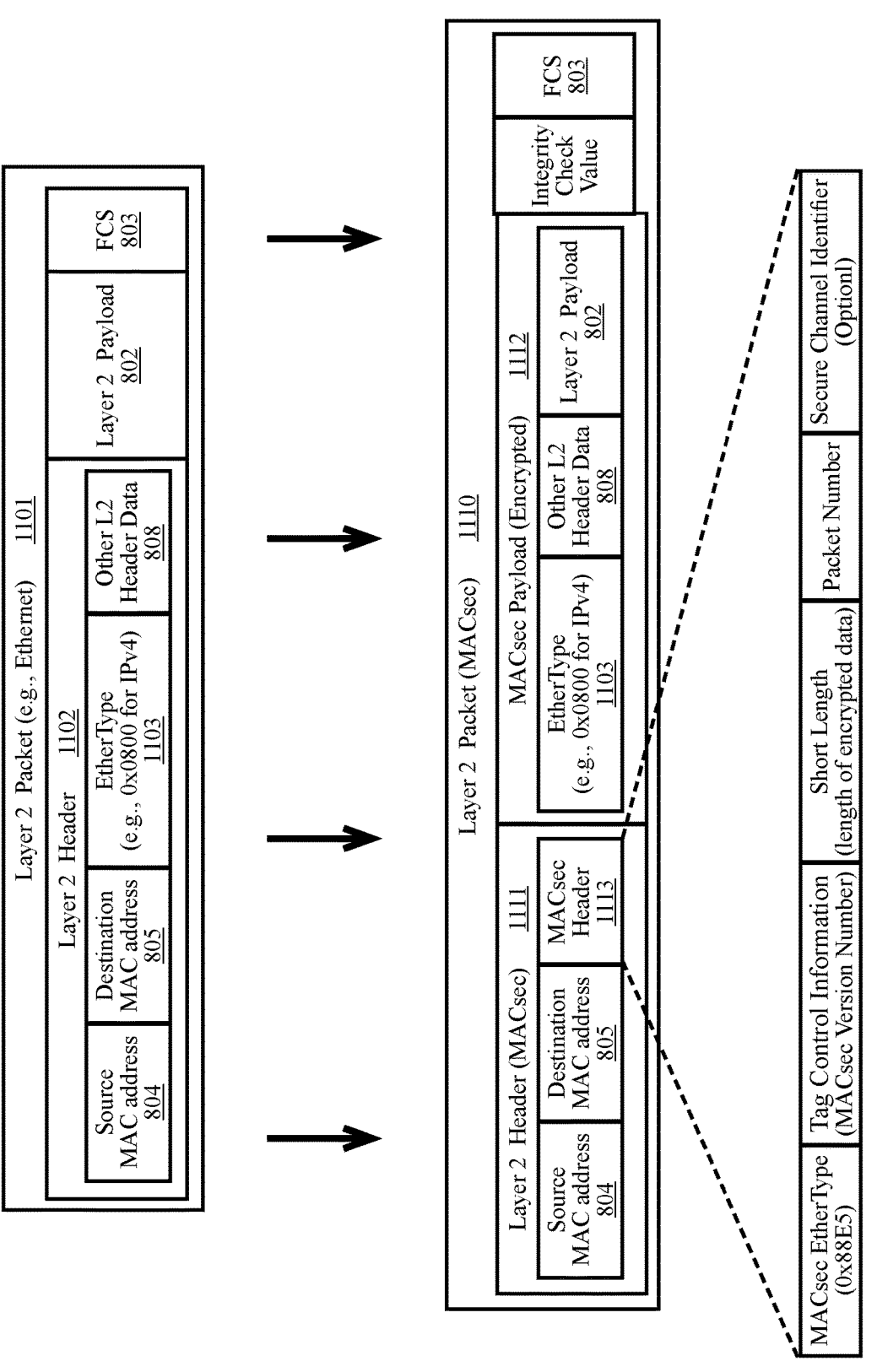
FIG. 11 is a high-level conceptual diagram illustrating a MACsec packet that can be produced from a layer 2 packet, according to some aspects.

FIG. 11 is a high-level conceptual diagram illustrating a MACsec packet 1110 that can be produced from a layer 2 packet 1101, according to some aspects. The layer 2 packet 1101 can be an ethernet packet, WiFi packet, or other layer 2 packet. The illustrated layer 2 packet 1101 is an ethernet packet that has a layer 2 header 1102, a layer 2 payload 802, and a layer 2 FCS 803. The layer 2 header 1102 can contain a source MAC address 804, a destination MAC address 805, an EtherType 1103, and other layer 2 header data 808. EtherType values are standardized by the ethernet specifications where EtherType=0x0800 indicates that the layer 2 payload 802 includes an IP version 4 (IPv4) packet.

The MACsec packet 1110 produced from the ethernet packet 1101 includes a layer 2 header 1111, a MACsec payload 1112, an integrity check value, and the FCS 803. The layer 2 header 1111 for the MACsec packet includes the source MAC address 804, the destination MAC address 805, and a MACsec header 1113. The source MAC address 804 and the destination MAC address 805 are the same as those in the layer 2 packet 1101. The MACsec header 1113 includes an EtherType of 0x88E5, tag control information (MACsec version number), a short length value (length of encrypted data), a packet number, and may optionally include a secure channel identifier. The MACsec payload 1112 is encrypted and can include information from the layer 3 packet such as the EtherType 1103, the other layer 2 header data 808, and the layer 2 payload 802.

FIG. 11 shows that the packet cryptographic and compressive transform detector 101 can infer that a cryptographic transform has been applied when a layer 2 packet has an EtherType equaling 0x88E5.

Figure 12:
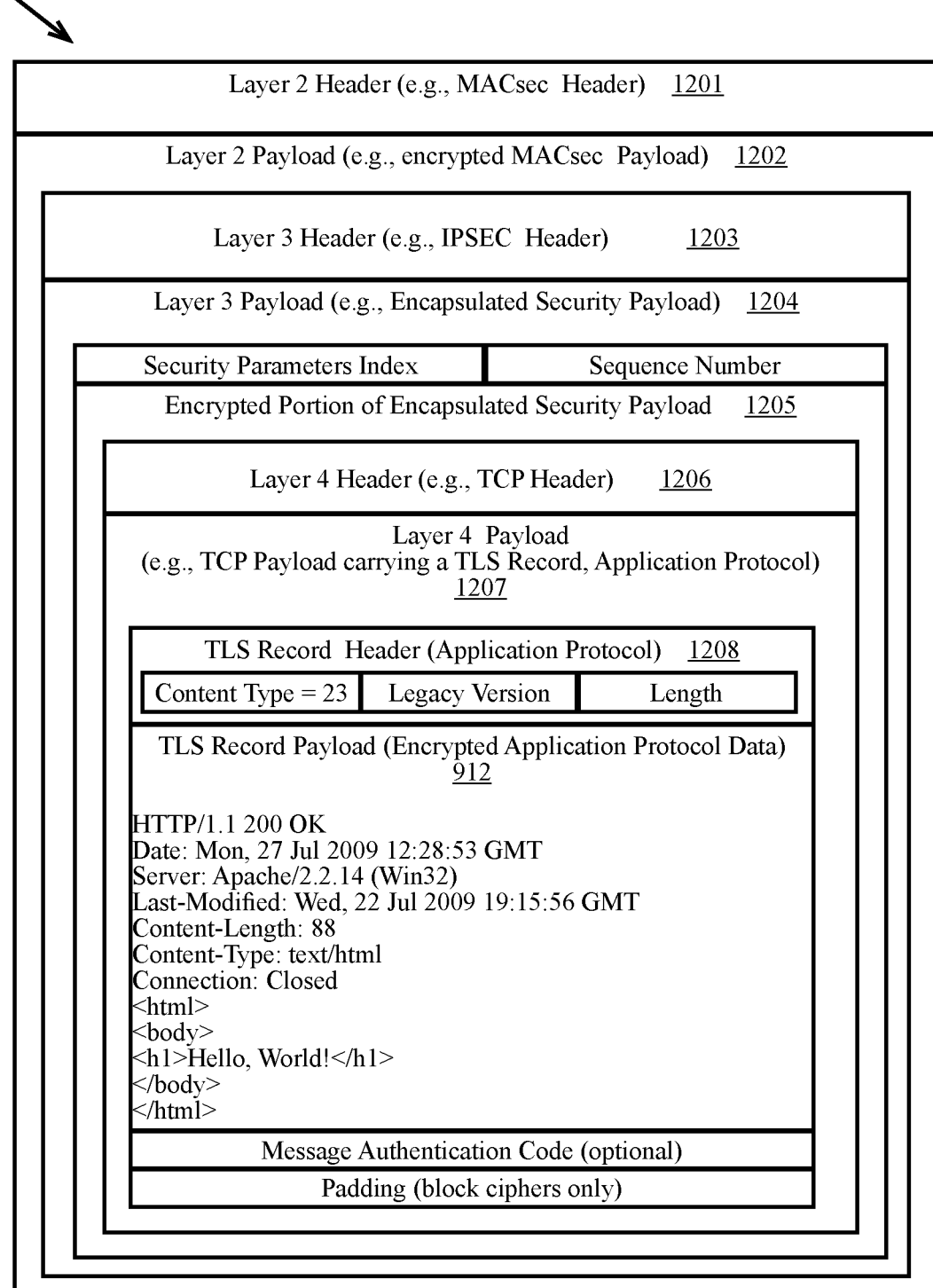
FIG. 12 is a high-level conceptual diagram illustrating a HTTP message that has been triple encrypted according to some aspects.

FIG. 12 is a high-level conceptual diagram illustrating a HTTP message that has been triple encrypted according to some aspects. A MACsec packet 1200 has a layer 2 header 1201 and an encrypted layer 2 payload 1202 in accordance with the MACsec specification. An IPSEC packet in the encrypted layer 2 payload 1202 has an IPSEC header 1203 and an ESP 1204. The ESP's encrypted portion 1205 includes a TCP packet. The TCP packet has a layer 4 header 1206 and a layer 4 payload 1207 that includes a TLS record. The TLS record includes a TLS record header 1208 and a TLS record payload 912. The TLS record payload 912 includes the HTTP message. This HTTP message is triple encrypted because it is encrypted by TLS, IPSEC, and MACsec. In practice, TLS is likely sufficient. Networking resources are thereby being wasted by the other levels of encryption.

An initial layer packet can be a layer 2 packet, a layer 3 packet, a layer 4 packet, a layer 7 packet, or a packet for some other layer. The subsequent layer packet is often a layer 2 packet when the initial layer packet is a layer 3 packet. The subsequent layer packet is often a layer 3 packet when the initial layer packet is a layer 4 packet. The subsequent layer packet is often a layer 4 packet when the initial layer packet is a layer 7 packet. Here, TLS could be considered to be a layer 7 packet because TLS is typically encapsulated in a layer 4 packet such as a TCP packet. In such a case, an HTTP packet encapsulated in a TLS packet would be a layer 7 packet encapsulated in another layer 7 packet. It is for this reason that TLS is sometimes considered to be between layer 4 and layer 7. In another case, the initial layer packet is an IP packet or other layer 3 packet that is encapsulated in a subsequent layer packet that is an IPSEC packet that is also a layer 3 packet. In yet another case, the initial layer packet is an ethernet or other layer 2 packet that is encapsulated in a subsequent layer packet that is a MACsec packet that is also a layer 2 packet. An initial layer header field is one of the header fields of an initial layer packet. Initial layer header fields contain initial layer header field data.

Figure 13:
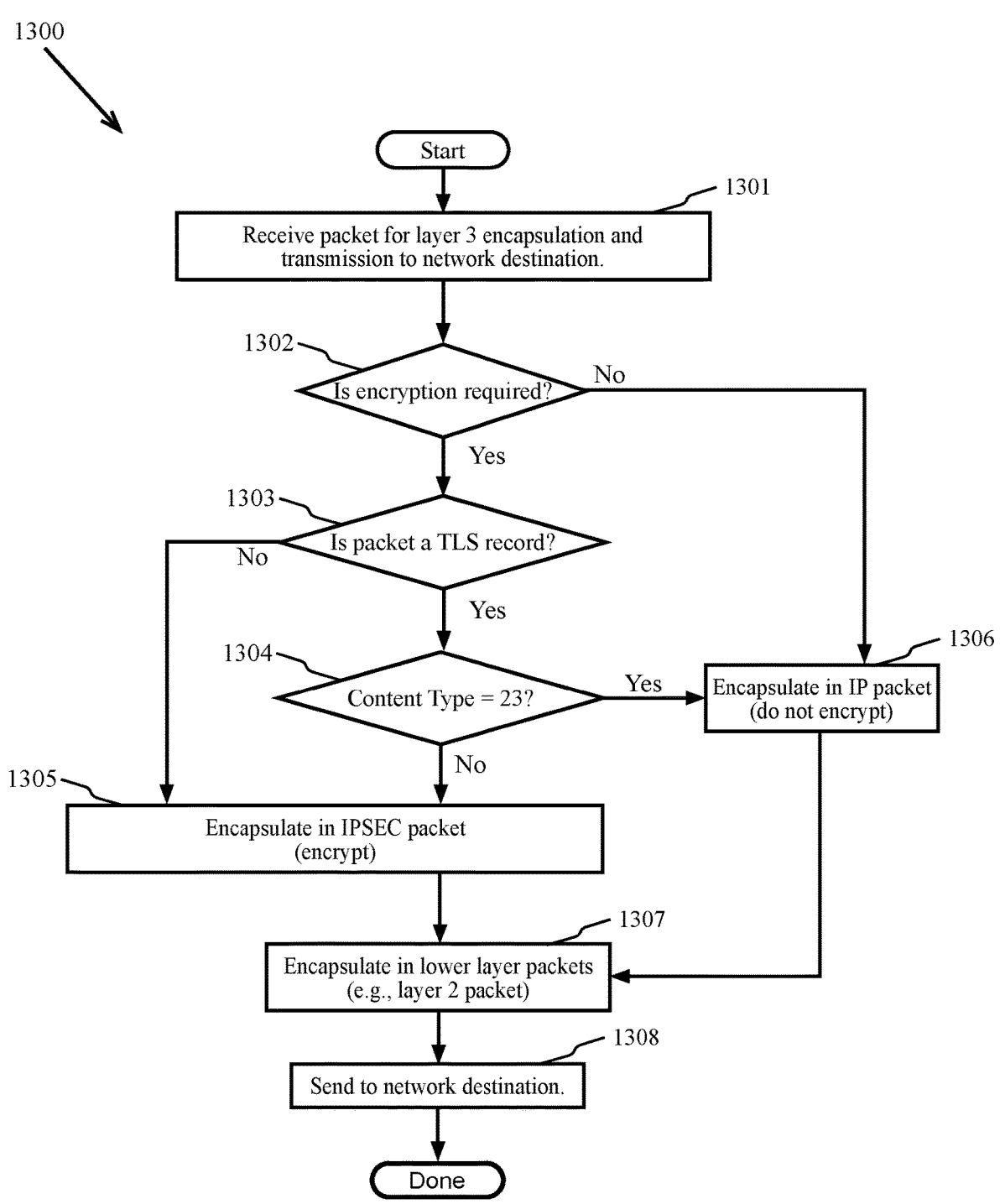
FIG. 13 is a high-level flow diagram illustrating a process that selectively applies a cryptographic transform to a layer 3 packet payload according to some aspects.

FIG. 13 is a high-level flow diagram illustrating a process that selectively applies a cryptographic transform to a layer 3 packet payload 1300 according to some aspects. After the start, at block 1301 the process receives a packet for layer 3 encapsulation and transmission to a network destination. At decision block 1302, the process checks if encryption is required. If encryption is not required, the process proceeds to block 1306. At block 1306, the process encapsulates the packet in an IP packet before proceeding to block 1307. If encryption is required, the process proceeds to decision block 1303. At decision block 1303, the process determines if the packet is a TLS record. If the packet is not a TLS record, the process proceeds to block 1305. At block 1305, the packet is encapsulated in an IPSEC packet before the process proceeds to block 1307. If the packet is a TLS record, the process proceeds to decision block 1304. At decision block 1304, the process determines if the TLS content type equals 23. A TLS content type equaling 23 indicates that the TLS record payload is encrypted. If the content type equals 23, the process proceeds to block 1306. If the content type does not equal 23, the process proceeds to block 1305. At block 1307, the IPSEC or IP packet is encapsulated in a layer 2 packet such as an Ethernet packet or other layer 2 packet. At block 1308, the packet is sent to the network destination.

Figure 14:
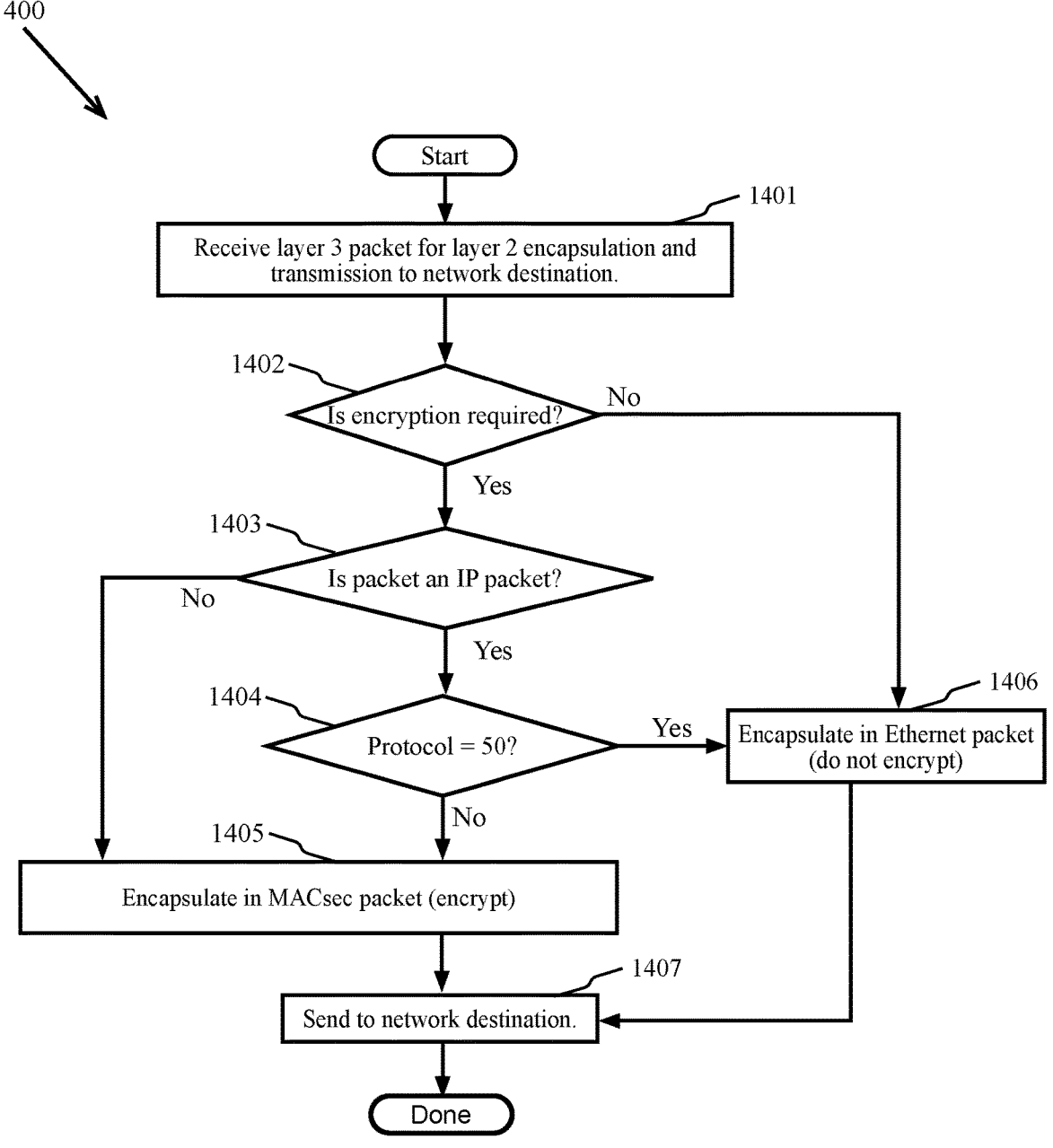
FIG. 14 is a high-level flow diagram illustrating a process that selectively applies a cryptographic transform to a layer 2 packet payload according to some aspects.

FIG. 14 is a high-level flow diagram illustrating a process that selectively applies a cryptographic transform to a layer 2 packet payload 1400 according to some aspects. After the start, at block 1401 the process receives a layer 3 packet for layer 2 encapsulation and transmission to a network destination. At decision block 1402, the process checks whether encryption is required. If no encryption is required, the process moves to block 1406. At block 1406, the layer 3 packet is encapsulated in an Ethernet packet before the process continues to block 1407. At block 1407, the packet is sent to the network destination. If, at decision block 1402, encryption is required then the process moves to decision block 1403 which determines whether or not the layer 3 packet is an IP packet. If the packet is not an IP packet, the process moves to block 1405. At block 1405, the layer 3 packet is encapsulated in a MACsec packet before the process continues to block 1407. If the packet is an IP packet, the process moves to decision block 1404. At decision block 1404, the process checks whether the protocol value in the protocol field in the IP packet equals 50. A protocol value of 50 indicates that the IP packet is actually an IPSEC packet and that the payload is already encrypted. If the protocol value does not equal 50, then the process moves to block 1405. If the protocol value equals 50, the process moves to block 1406.

Figure 15:
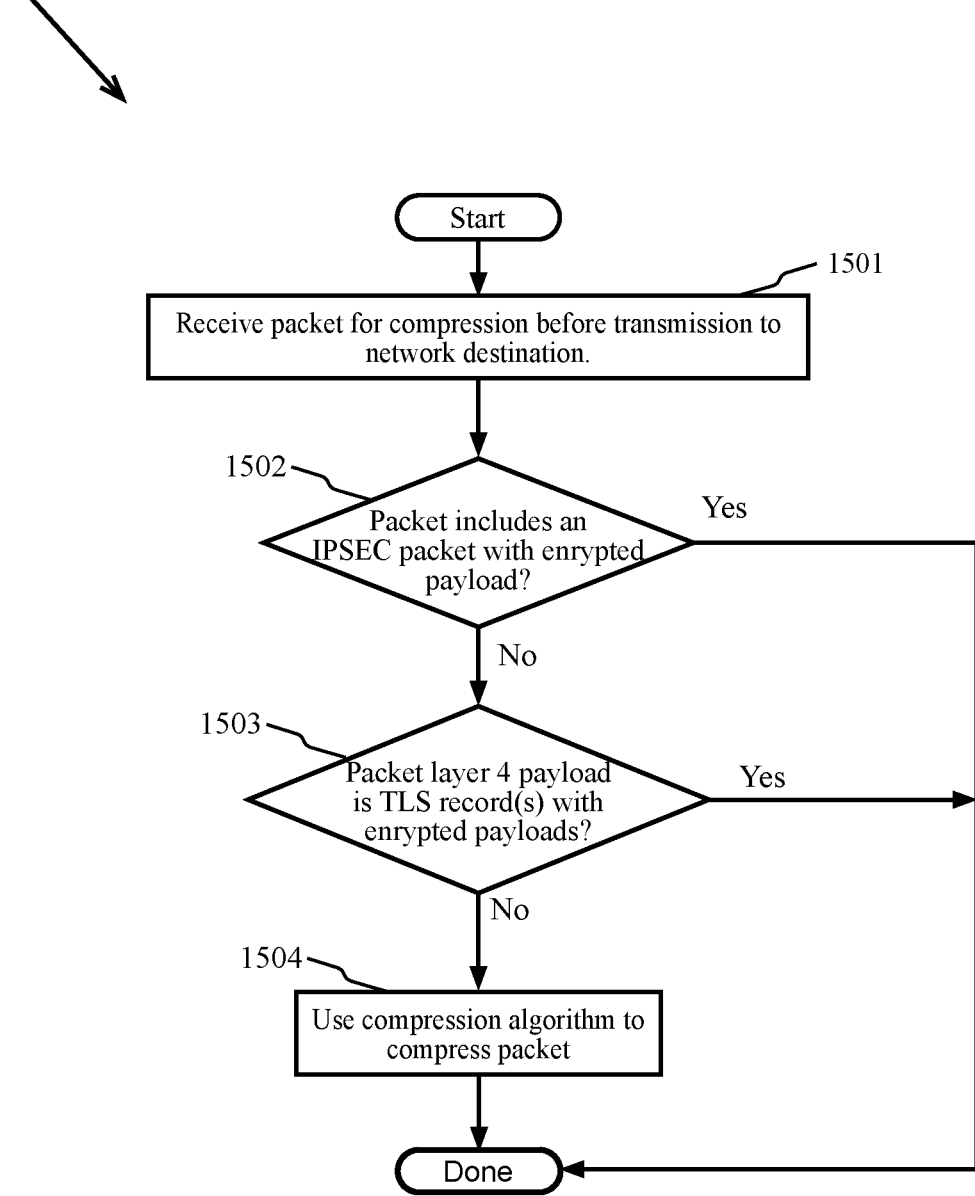
FIG. 15 is a high-level flow diagram illustrating a process that selectively applies a compressive transform to a packet according to some aspects.

FIG. 15 is a high-level flow diagram illustrating a process that selectively applies a compressive transform to a packet 1500 according to some aspects. After the start, at block 1501 the process receives a packet for compression before transmission to a network destination. At decision block 1502 the process checks if the packet is or includes an IPSEC packet that has an encrypted payload (e.g., EtherType=0x0800 and protocol value=50). If the packet is not and does not include an IPSEC packet, the process moves to decision block 1503. Otherwise, the process is done and no compression is performed. At decision block 1503 the process checks if the packet's layer 4 payload is one or more TLS records with encrypted payloads. This condition may be met if every TLS record in the layer 4 payload has a content type equaling 23. If the packet's layer 4 payload is one or more TLS records with encrypted payloads the process is done and no compression is performed. Otherwise, the process moves to block 1504. At block 1504, the packet is compressed. The packet may be compressed in accordance with a standard such as IPCOMP (IETF RFC 3173).

Figure 16:
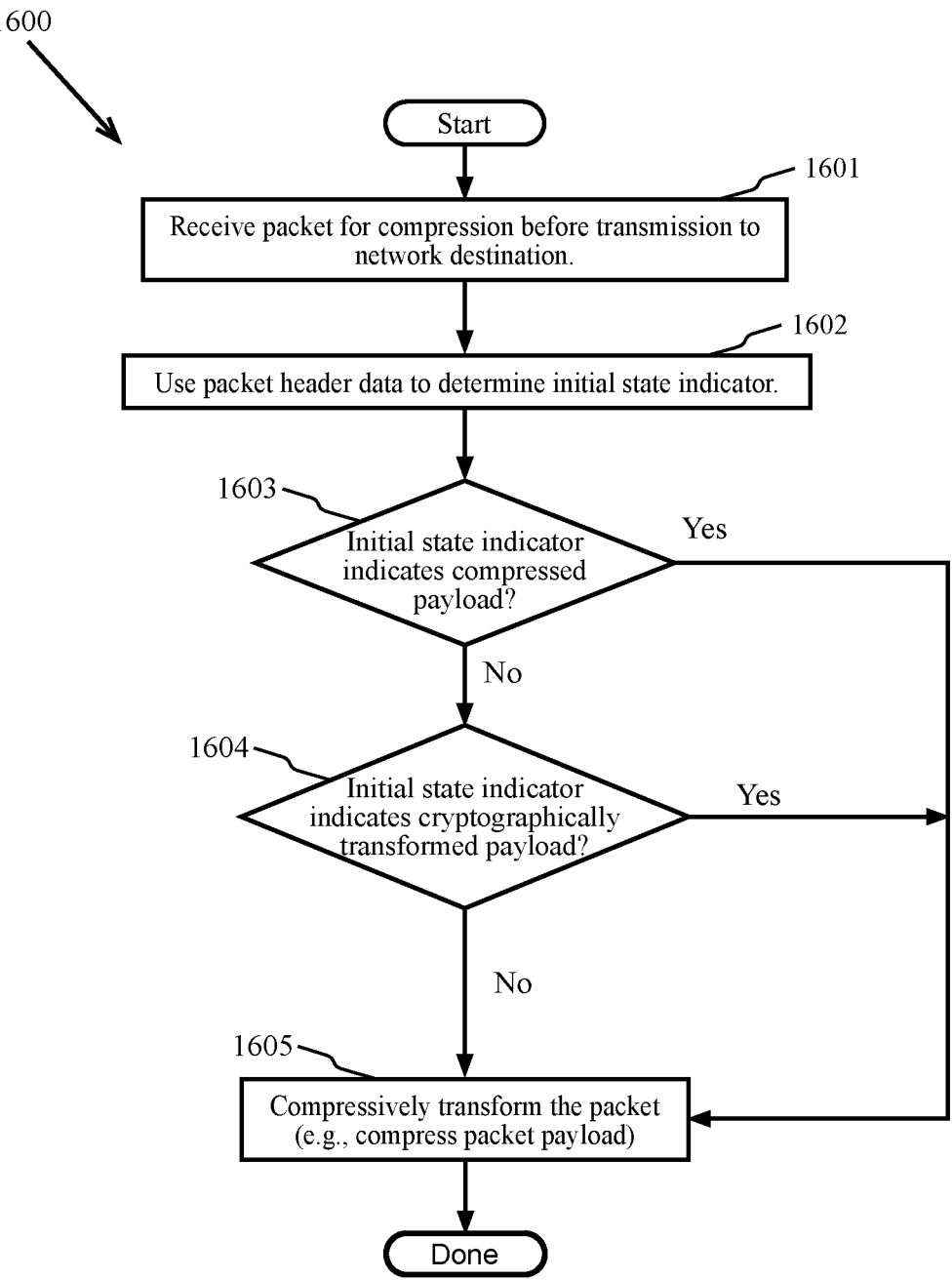
FIG. 16 is a high-level flow diagram illustrating a process that selectively applies a compressive transform to a packet according to some aspects.

FIG. 16 is a high-level flow diagram illustrating a process that selectively applies a compressive transform to a packet 1600 according to some aspects. After the start, at block 1601 the process can receive a packet for compression before transmission to a network destination. At block 1602, the packets header data is used to determine an initial state indicator. The header data can include layer 7 header data, layer 4 header data, layer 3 header data, layer 2 header data, etc. At decision block 1603, the process checks whether the initial state indicator indicates a compressed payload (e.g., IPCOMP or HTTP/DASH). If the initial state indicator indicates a compressed payload, the process is done and no second compression step is performed. If the initial state indicator does not indicate a compressed payload, the process moves to decision block 1604. At decision block 1604, the process checks whether the initial state indicator indicates a cryptographically transformed payload (e.g., IPSEC, encrypted TLS record payloads, etc.). If the initial state indicator indicates a cryptographically transformed payload the process is done and no compression step is performed. If the initial state indicator does not indicate a cryptographically transformed payload the process moves to block 1605. At block 1605, the packet is compressively transformed. For example, an IPCOMP packet can be produced from an IP packet. A CPU offload circuit or a compression algorithm may be used to compressively transform some or all of the packet.

Figure 17:
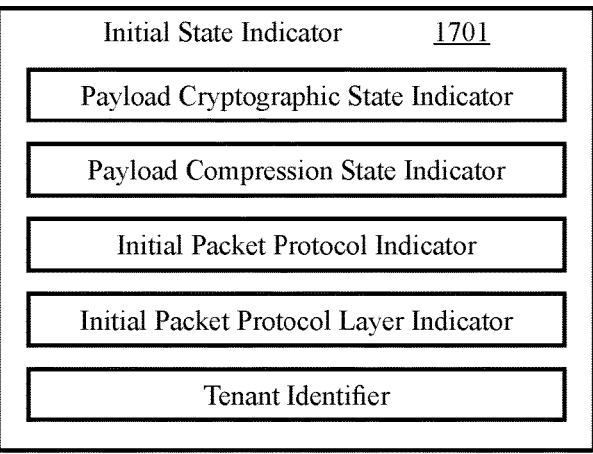
FIG. 17 is a high-level block diagram illustrating an initial state indicator according to some aspects.

FIG. 17 is a high-level block diagram illustrating an initial state indicator 1701 according to some aspects. The initial state indicator can indicate the payload state of an initial layer packet. The initial state indicator 1701 can include a payload cryptographic state indicator, a payload compressive state indicator, an initial packet protocol indicator, an initial packet protocol layer indicator, and a tenant identifier. The initial state indicator 1701 may indicate an initial cryptographic state or an initial compressive state of an initial layer packet, a network packet payload, or a session packet payload because the initial state indicator 1701 may include a payload cryptographic state indicator and a payload compressive state indicator. The payload cryptographic state indicator can indicate whether the packet includes an encrypted payload (e.g., payload state=encrypted or payload state=not encrypted). The payload compressive state indicator can indicate whether the packet includes a compressed payload (e.g., payload state=compressed or payload state=not compressed). The initial packet protocol indicator can indicate the protocol of the initial state packet. For example, if the packet is a layer 3 packet, the initial packet protocol indicator can indicate a layer 3 protocol such as IP. The initial packet protocol layer indicator can indicate the protocol layer of the initial packet. The tenant identifier can indicate the tenant for whom the packet is being processed. The tenant identifier may be useful for selectively applying transforms to packets. For example, a hosting service may run workloads (e.g., virtual machines) for a number of tenants on servers that are equipped with smartNICs (e.g., network appliance 430 illustrated in FIG. 4). The smartNICs may be configured to selectively apply cryptographic transforms (e.g., compression, authentication, etc.) or compressive transforms (e.g., Huffman coding) to packets or packet payloads. The hosting service may provide selective encryption/compression as a service to the tenants and different tenants may choose different service levels or implementation levels. As such, the tenant identifier can be used when selecting whether and how to transform a packet. Tenant identifiers may be determined based on IP address, a virtual machine identifier, which virtual PCIe function a workload accesses, etc. A packet processing pipeline circuit, such as a P4 pipeline, can include a parser that parses packet headers and places the header data in a PHV. The match-action units in the packet processing pipeline circuit may use the PHV to produce the initial state indicator 1701.

Figure 18:
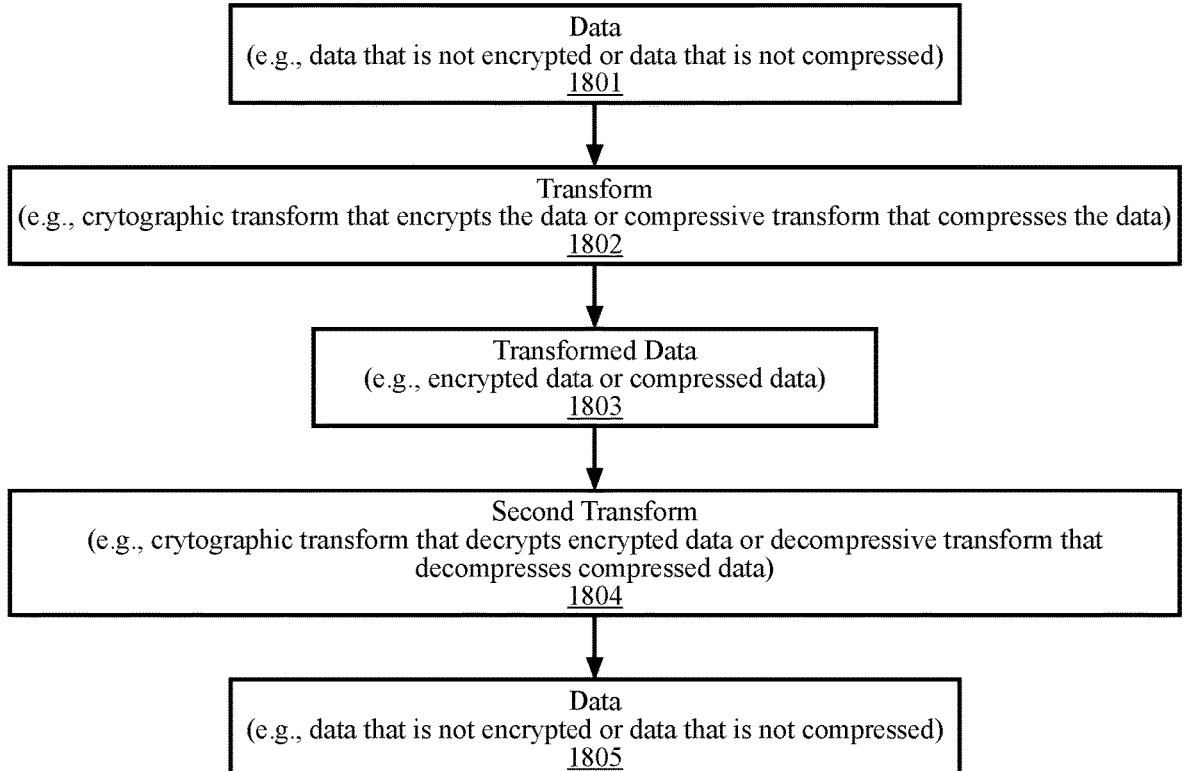
FIG. 18 is a high-level conceptual diagram illustrating applying transforms to data such as packet payloads according to some aspects.

FIG. 18 is a high-level conceptual diagram illustrating applying transforms to data such as packet payloads according to some aspects. Data 1801 can originate in a raw state. Such data 1801 is not encrypted or compressed. A first transform 1802 can be applied to the data. The first transform 1802 can be a cryptographic transform such that the data is encrypted or can be a compressive transform such that the data is compressed. The first transform 1802 produces transformed data 1803 that can be encrypted data or compressed data. A second transform 1804 can be applied to the transformed data 1803. The second transform may reverse the first transform 1802. The second transform may be a cryptographic transform that decrypts data that has been encrypted by the first transform 1802. The second transform may be a decompressive transform that decompresses data that has been compressed by the first transform 1802. Data 1805 is no longer transformed when data 1805 is identical to data 1801.

Figure 19:
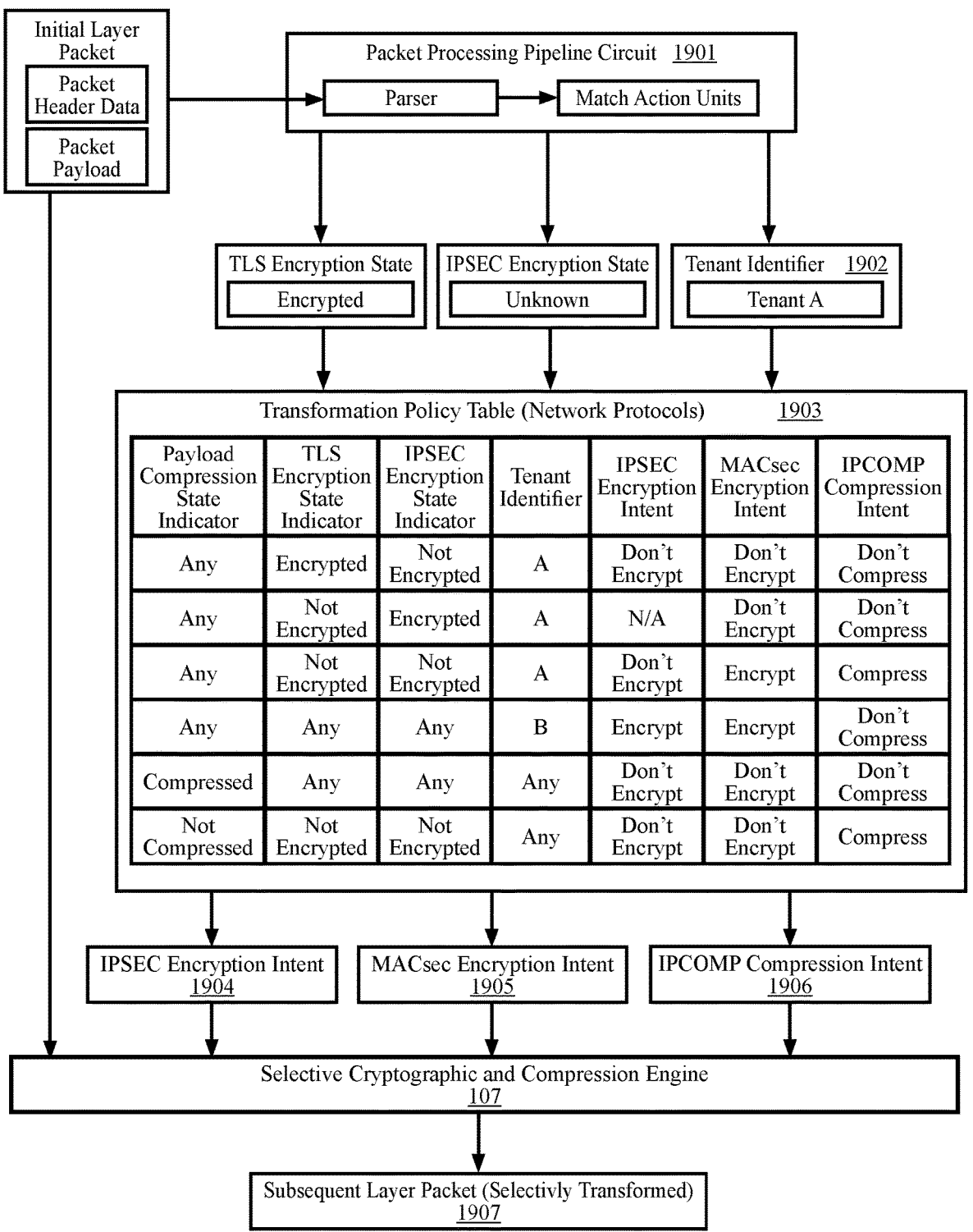
FIG. 19 is a high-level block diagram illustrating using a transformation policy table for selectively applying a cryptographic transform or a compressive transform to a packet according to some aspects.

FIG. 19 is a high-level block diagram illustrating using a transformation policy table 1903 for selectively applying a cryptographic transform or a compressive transform to a packet according to some aspects. A transformation policy table 1903 can associate transformation intents with payload states such as the payload states that can be indicated by an initial state indicator. An initial layer packet has packet header data and a packet payload. Selectively applying a transform to a subsequent layer payload can be accomplished by using a transformation policy table to identify a transformation intent and then transforming the subsequent layer payload in accordance with the transformation intent. For example, the subsequent layer payload is encrypted when the transformation intent is "encrypt". Data undergoes a cryptographic transformation when a cryptographic transform (e.g., encryption) is applied to the data. Data undergoes a compressive transformation when a compressive transform (e.g., data compression) is applied to the data.

A packet processing pipeline circuit 1901 that includes a parser and numerous match-action units can process the initial layer packet. The packet processing pipeline circuit 1901 can examine the packet header data and produce an initial state indicator 1701. The initial state indicator 1701 can include a tenant identifier 1902 and can indicate whether a cryptographic or compressive transform has been applied to the packet payload. In the example of FIG. 19, the initial state indicator 1701 indicates that TLS encryption state is "encrypted", the IPSEC encryption state is "unknown", and the initial packet is being processed for tenant A. A TCP packet (layer 4) that consists of TLS records with content type=23 may have TLS encryption state=encrypted and IPSEC encryption state=unknown. The transformation policy table 1903 indicates the compressive and cryptographic transforms that are to be applied to an initial packet based on the data in an initial state indicator for the initial packet. Looking to the first policy of the transformation policy table 1903, for tenant "A" if the initial packet contains encrypted TLS records, then the IPSEC encryption intent is "don't encrypt", the MACsec encryption intent is "don't encrypt" and the IPCOMP compression intent is "don't compress". As such, the initial packet will not be encapsulated in an IPSEC packet, a MACsec packet, or an IPCOMP packet. Here, tenant "A" believes that the encrypted TLS record payloads provide sufficient security and that packets should not be encrypted a second or a third time. In addition, tenant A does not believe that compressing packets that have encrypted payloads is worthwhile. Tenant "A" indicates similar thinking in the second policy where IPSEC packets are not encapsulated in MACsec packets or IPCOMP packets. Policy three indicates that tenant "A" wants packets having no encryption to be compressed (by encapsulation in IPCOMP packets) and then encapsulated in MACsec packets. The fourth policy of the transformation policy table 1903 indicates that tenant "B" simply wants all traffic encapsulated in IPSEC packets and MACsec packets. The fifth policy indicates that the hosting provider does not want to compress or encrypt packets that already have compressed payloads. The sixth policy indicates that the hosting provider wants to apply compressive transforms to all packets that are not already encrypted or compressed.

The transformation policy table and an initial state indicator can be used to look up an IPSEC encryption intent 1904, a MACsec encryption intent 1905, and an IPCOMP compression intent 1906. The selective encryption engine and compression engine 107 can selectively transform the initial packet based on the IPSEC encryption intent 1904, the MACsec encryption intent 1905, and the IPCOMP compression intent. The IPSEC encryption intent 1904 can indicate whether the initial packet is to be encapsulated in an IPSEC packet (encrypted) or an IP packet (not encrypted). The MACsec encryption intent 1905 can indicate whether the initial packet is to be encapsulated in a MACsec packet (encrypted) or Ethernet/WiFi/etc. packet (not encrypted). The IPCOMP compression intent 1906 can indicate whether the initial packet is to be encapsulated in an IPCOMP packet (compressed) or an IP packet (not compressed). The selective encryption engine and compression engine 107 selectively transforms the initial packet and encapsulates the initial packet in a subsequent packet 1907.

The packet processing pipeline circuit 1901 can include a parser and numerous match-action units. The match-action units are arranged as a match-action pipeline such as the match action pipeline 300 illustrated in FIG. 3. The parser and the match-action units can be arranged as the processing stages of a packet processing pipeline implemented by the packet processing pipeline circuit 1901. The processing stages can include a parsing stage implemented by a parser circuit and a series of match-action stages implemented by the match-action units. The inputs to the match action units can be PHVs produced by a previous processing stage such as the parser circuit or a preceding match-action unit. The PHV can include the values of the header fields of a packet. A match-action unit can implement all or some of a packet cryptographic and compressive transform inferencer because the match-unit can set an initial state indicator based on the data in the PHV. The match-action unit can include the initial state indicator in the PHV that is passed to the next match action unit in the pipeline. The next match-action unit may perform more inferencing by examining other packet header fields and adding to or amending the initial state indicator. A match-action unit can implement the selective part of a subsequent layer packet encapsulator. For example, the match-action unit can use the initial state indicator and the transformation policy table 1903 to determine compression and cryptographic intents. The intents may be added as meta data to the PHV. A match-action unit may command the cryptographic transform circuit 420, the compression circuit, or the decompression circuit to apply a transform to a packet's payload data based on the compression and cryptographic intents. For example, if the intent indicates that a cryptographic transform is to be applied, then a match-action unit can issue a command for the cryptographic transform circuit 420 to encrypt specific data in the memory. That specific data can be data that is to be included in the payload of a subsequent layer packet.

FIG. 20A, FIG. 20B, FIG. 20C, and FIG. 20D are high-level block diagrams illustrating exemplary transformation policy tables that may be used for selectively transforming a packet according to some aspects. FIG. 19 illustrates a transformation policy table 1903 where transformation intents are based on the protocols used by the initial packet. FIG. 20A, FIG. 20B, FIG. 20C, and FIG. 20D illustrate transformation policy tables where the transformation intents apply to protocol layers and are based on the transformation state (e.g., encrypted, compressed, etc.) of the initial packet's protocol layers.

FIG. 20A illustrates a transformation policy table 2001 that may be applied to an initial packet that may have header data for numerous protocol layers. A network switch or router may use such a transformation policy table 2001 because switches and routers receive, process, and transmit initial packets that include headers and data for many protocol layers. Layer transformation intents can indicate whether to apply a transform when encapsulating a packet. A layer 2 transformation intent indicates whether to apply a transformation when encapsulating a layer 3 packet in a layer 2 packet (e.g., IP/IPSEC/IPCOMP into either Ethernet, WiFi, or MACsec). A layer 3 transformation intent indicates whether to apply a transformation when encapsulating a layer 4 packet in a layer 3 packet.

FIG. 20B illustrates a transformation policy table 2002 that indicates layer 2 and layer 3 transformation intents based on the state of the initial packet's payload. For example, the state of the layer 3 payload is used if the initial packet is a layer 4 packet.

FIG. 20C illustrates a transformation policy table 2003 that indicates subsequent packet transformation intents based on the state of the initial packet's payload. For example, the if the initial packet is a layer 4 packet, then the subsequent packet is a layer 3 packet and whether the initial packet payload is encrypted or compressed can determine whether the layer 3 packet is an IP packet, an IPSEC packet, or an IPCOMP packet. Another example is if the initial packet is a layer 3 packet, then the subsequent packet is a layer 2 packet and whether the initial packet payload is encrypted or compressed can determine whether the layer 2 packet is an Ethernet packet or a MACsec packet.

FIG. 20D illustrates a transformation policy table 2004 that indicates subsequent packet transformation intents based on the initial packet's protocol and the state of the initial packet's payload. For example, the first policy indicates that if an initial packet is an IP packet for tenant "A" with an unencrypted payload, then the subsequent packet is an IPSEC packet for tenant "A". This subsequent packet still needs to be encapsulated by a layer 2 packet and the fourth policy governs such encapsulation. IPSEC packets for tenant "A" are not further encrypted and are encapsulated in Ethernet or WiFi packets.

FIG. 21 is a high-level flow diagram illustrating a method for selective encryption of network packets 2100 according to some aspects. After the start, at block 2101 the process can receive an initial layer packet for transmission to a network destination. At block 2102 the process can use an initial layer header of the initial layer packet to determine an initial state indicator that indicates an initial state of an initial layer payload of the initial layer packet. At block 2103 the process can encapsulate the initial layer packet in a subsequent layer packet as a subsequent layer payload. At block 2104 the process can selectively apply a transform to the subsequent layer payload based on the initial state indicator, wherein the initial state indicator indicates a cryptographic state or a compressive state of the initial layer payload, and the transform is a compressive transform or a cryptographic transform.

Aspects described above can be ultimately implemented in a network appliance that includes physical circuits that implement digital data processing, storage, and communications. The network appliance can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk.

Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
storing a transformation policy table that associates a plurality of transformation intents with a plurality of payload states for a plurality of network protocols;
receiving an initial layer packet for transmission to a network destination;
using the transformation policy table to determine a transformation intent for the initial layer packet in response to determining an initial state of an initial layer payload of the initial layer packet; and
encapsulating the initial layer packet in a subsequent layer packet as a subsequent layer payload, the initial layer packet selectively transformed in accordance with the transformation intent.

2. The method of claim 1, wherein:
the transformation intent is determined based on a cryptographic state or a compressive state of the initial layer payload; and
the transformation intent indicates a compressive transform or a cryptographic transform.

3. The method of claim 1, wherein the subsequent layer packet is an internet protocol (IP) packet.

4. The method of claim 1, wherein the subsequent layer packet is an Ethernet packet.

5. The method of claim 1, further including:
using header field data extracted from a packet header of the initial layer packet to determine the transformation intent.

6. The method of claim 1, wherein no transform is not applied to the initial layer packet in response to determining that the initial layer payload is encrypted.

7. The method of claim 6, wherein the initial layer packet is a transport layer security (TLS) record or a Secure Socket Layer (SSL) message or a layer 7 packet.

8. The method of claim 6, wherein the initial layer packet is a layer 4 packet.

9. The method of claim 6, wherein the initial layer packet is a layer 3 packet or an IP packet.

10. The method of claim 6, wherein the subsequent layer packet is an internet protocol security (IPSEC) packet.

11. The method of claim 6, wherein the initial layer packet is an internet protocol security (IPSEC) packet.

12. The method of claim 6, wherein the subsequent layer packet is a media access control security (MACsec) packet.

13. The method of claim 1, wherein no transform is applied to the initial layer packet in response to determining that the initial layer payload is compressed.

14. The method of claim 1, wherein:
the transformation policy table further associates the transformation intents with the payload states for a plurality of protocol layers.

15. The method of claim 14, wherein the transformation policy table further associates the transformation intents with a plurality of tenant identifiers, the transformation intent selected in response to determining a one of the tenant identifiers corresponding to the initial layer packet.

16. The method of claim 1, wherein:
the transformation policy table further associates the transformation intents with a plurality of tenant identifiers; and
the transformation intent is selected in response to determining a one of the tenant identifiers corresponding to the initial layer packet.

17. The method of claim 1, wherein:
a network appliance includes a packet processing pipeline circuit that includes a parser;
the parser extracts a header field data from the initial layer packet; and
the network appliance uses the header field data to determine the initial state of the initial layer payload of the initial layer packet.

18. The method of claim 1, wherein the transformation intent indicates applying a cryptographic transform, the transformation intent selected in response to determining that the initial layer payload is not encrypted.

19. The method of claim 1, wherein the transformation intent indicates a compressive transform is not applied, the transformation intent selected in response to determining that the initial layer payload is encrypted.

20. The method of claim 1, wherein the transformation intent indicates not applying a compressive transform, the transformation intent selected in response to determining that the initial layer payload is encrypted.

21. A method comprising:
storing a transformation policy table that associates a plurality of transformation intents with a plurality of payload states for a plurality of network protocols;
communicating with a remote host using a plurality of session packets of a session that includes a plurality of inbound session packets and a plurality of outbound session packets;
using the transformation policy table to determine a transformation intent for the outbound session packets in response to determining an initial state of the session; and
selectively applying a transform to the outbound session packets in accordance with the transformation intent, wherein
the initial state is an initial cryptographic state or an initial compressive state,
the transform is a compressive transform or a cryptographic transform,
the outbound session packets are transmitted to the remote host, and
the inbound session packets are received from the remote host.

22. The method of claim 21, wherein the transformation intent is determined using an internet protocol header of one of the session packets.

23. The method of claim 21, wherein the transformation intent is determined using a TLS, SSL or layer 7 header of one of the session packets.

24. The method of claim 21, wherein:
the transformation intent is determined using data extracted from a header field of one of the session packets by a parser of a packet processing pipeline circuit in a network appliance; and
the network appliance selectively applies the transform to the outbound session packets.

25. A system comprising:
a storage means for storing a transformation policy table that associates a plurality of transformation intents with a plurality of payload states for a plurality of network protocols;

a determination means for using the transformation policy table to determine a transformation intent for a packet in response to determining an initial state of the packet; and a means for encapsulating the packet in a second packet, the packet selectively transformed in accordance with the transformation intent.

26. The system of claim 25, wherein:

the transformation intent is determined based on the initial state of the packet and a network protocol of the packet.

27. The system of claim 25, further including:

a CPU offload means for extracting a header field data from a packet header wherein the transformation intent is determined based on the header field data and a network protocol of the packet.

28. A system comprising:

a memory configured to store a transformation policy table that associates a plurality of transformation intents with a plurality of payload states for a plurality of network protocols;

packet processing pipeline circuitry that includes a parser and a plurality of match-action units configured as a plurality of processing stages of a packet processing pipeline;

at least one central processing unit (CPU) core that configures the packet processing pipeline to:

use the transformation policy table to determine a transformation intent in response to determining an encryption state of a payload of a packet; and encapsulate the packet in a second packet after the second packet is selectively transformed in accordance with the transformation intent.

29. The system of claim 28, wherein:

the at least one CPU core further configures the packet processing pipeline to command a cryptographic transform circuit to apply a cryptographic transform to the packet in accordance with the transformation intent.

30. The system of claim 28, wherein the at least one CPU core configures the packet processing pipeline to implement a packet cryptographic and compressive transform inferencer.

31. The system of claim 30, further including:

a cryptographic transform circuit configured to selectively apply a cryptographic transform in accordance with the transformation intent.

32. The system of claim 28, wherein:

a cryptographic transform circuit applies a cryptographic transform to the packet in accordance with the transformation intent after a compression circuit applies a compressive transform to the packet in accordance with the transformation intent.

33. The system of claim 32, wherein a transform is applied to the packet in response to determining that the payload is not encrypted or not compressed.

34. The system of claim 28, further including:

a compression circuit, wherein the at least one CPU core further configures the packet processing pipeline to command the compression circuit to apply a compressive transform to the packet in accordance with the transformation intent.

* * * * *